(12) United States Patent
McGee et al.

(10) Patent No.: US 7,076,695 B2
(45) Date of Patent: Jul. 11, 2006

(54) SYSTEM AND METHODS FOR ADAPTIVE THRESHOLD DETERMINATION FOR PERFORMANCE METRICS

(75) Inventors: John McGee, Manchester, NH (US); John Michael Earley, Amherst, NH (US); James W. Matthews, Holden, MA (US)

(73) Assignee: Opnet Technologies, Inc., Bethesda, MD (US)

( * ) Notice: Subject to any disclaimer, the term of this patent is extended or adjusted under 35 U.S.C. 154(b) by 408 days.

(21) Appl. No.: 10/198,689

(22) Filed: Jul. 18, 2002

(65) Prior Publication Data

US 2003/0079160 A1 Apr. 24, 2003

Related U.S. Application Data

(60) Provisional application No. 60/322,021, filed on Sep. 13, 2001, provisional application No. 60/307,055, filed on Jul. 20, 2001.

(51) Int. Cl.
*G06F 11/00* (2006.01)

(52) U.S. Cl. .................. 714/47; 709/223; 709/224; 702/179; 702/186

(58) Field of Classification Search ............. 714/47, 714/4; 709/223, 224; 702/179, 186, 188
See application file for complete search history.

(56) References Cited

U.S. PATENT DOCUMENTS

| | | | |
|---|---|---|---|
| 4,821,220 A | 4/1989 | Duisberg | |
| 5,062,055 A | 10/1991 | Chinnaswamy et al. | .... 364/513 |
| 5,101,348 A | 3/1992 | Arrowood et al. | .......... 395/200 |
| 5,161,116 A | 11/1992 | Schneider et al. | ..... 364/551.01 |
| 5,307,499 A | 4/1994 | Yin | |
| 5,367,473 A | 11/1994 | Chu et al. | .............. 364/551.01 |
| 5,375,070 A | 12/1994 | Hershey et al. | ............. 364/550 |
| 5,432,932 A | 7/1995 | Chen et al. | .................. 395/650 |
| 5,450,406 A | 9/1995 | Esaki et al. | ................. 370/60.1 |
| 5,459,837 A | 10/1995 | Caccavale | .............. 395/184.01 |
| 5,459,868 A | 10/1995 | Fong | |
| 5,475,625 A | 12/1995 | Glaschick | ................... 395/600 |
| 5,475,843 A | 12/1995 | Halviatti et al. | |
| 5,483,468 A | 1/1996 | Chen et al. | ............ 364/551.01 |
| 5,491,791 A | 2/1996 | Glowny et al. | ........ 395/183.13 |
| 5,504,921 A | 4/1996 | Dev et al. | ................... 395/800 |
| 5,506,955 A | 4/1996 | Chen et al. | ............ 395/183.02 |
| 5,513,126 A | 4/1996 | Harkins et al. | ......... 364/514 A |

(Continued)

FOREIGN PATENT DOCUMENTS

DE 296 00 609 U1 3/1997

(Continued)

OTHER PUBLICATIONS

Rundensteiner, E.A., "Design Tool Integration Using Object-Oriented Database Views," IEEE, 1993, pp. 104-107.

(Continued)

*Primary Examiner*—Robert Beausoliel
*Assistant Examiner*—Emerson Puente
(74) *Attorney, Agent, or Firm*—Davis & Bujold, P.L.L.C.

(57) ABSTRACT

A system and method for dynamically generating alarm thresholds for performance metrics, and for applying those thresholds to generate alarms is described. Statistical methods are used to generate one or more thresholds for metrics that may not fit a Gaussian or normal distribution, or that may exhibit cyclic behavior or persistent shifts in the values of the metrics. The statistical methods used to generate the thresholds may include statistical process control (SPC) methods, normalization methods, and heuristics.

19 Claims, 19 Drawing Sheets

U.S. PATENT DOCUMENTS

| | | | | |
|---|---|---|---|---|
| 5,553,235 | A | 9/1996 | Chen et al. | 395/182.18 |
| 5,555,191 | A | 9/1996 | Hripcsak | 364/514 R |
| 5,572,672 | A | 11/1996 | Dewitt et al. | 395/184.01 |
| 5,581,482 | A | 12/1996 | Wiedenman et al. | 364/551.01 |
| 5,581,696 | A | 12/1996 | Kolawa et al. | 395/183.114 |
| 5,586,254 | A | 12/1996 | Kondo et al. | 395/200.1 |
| 5,598,429 | A | 1/1997 | Marshall | 375/210 |
| 5,615,135 | A | 3/1997 | Waclawsky et al. | 364/551.01 |
| 5,615,323 | A | 3/1997 | Engel et al. | 395/140 |
| 5,616,904 | A | 4/1997 | Fernadez | 235/449 |
| 5,619,656 | A | 4/1997 | Graf | 395/200.11 |
| 5,621,663 | A | 4/1997 | Skagerling | 364/550 |
| 5,634,009 | A | 5/1997 | Iddon et al. | 395/200.11 |
| 5,636,344 | A | 6/1997 | Lewis | 395/200.11 |
| 5,655,081 | A | 8/1997 | Bonnell et al. | 395/200.32 |
| 5,661,668 | A | 8/1997 | Yemini et al. | 364/550 |
| 5,668,944 | A | 9/1997 | Berry | 395/184.01 |
| 5,675,510 | A | 10/1997 | Coffey et al. | 364/514 A |
| 5,684,945 | A | 11/1997 | Chen et al. | 395/182.18 |
| 5,696,486 | A | 12/1997 | Poliquin et al. | 340/506 |
| 5,696,701 | A | 12/1997 | Burgess et al. | 364/551.01 |
| 5,699,403 | A | 12/1997 | Ronnen | 379/32 |
| 5,732,273 | A | 3/1998 | Srivastava et al. | |
| 5,740,441 | A | 4/1998 | Yellin et al. | |
| 5,748,098 | A | 5/1998 | Grace | 340/825.16 |
| 5,752,062 | A | 5/1998 | Gover et al. | 355/800 |
| 5,758,071 | A | 5/1998 | Burgess et al. | 395/200.5 |
| 5,778,230 | A | 7/1998 | Wimble et al. | 395/704 |
| 5,796,663 | A | 8/1998 | Park et al. | 365/200 |
| 5,799,154 | A | 8/1998 | Kuriyan | 395/200.53 |
| 5,802,256 | A | 9/1998 | Heckerman et al. | 395/75 |
| 5,815,718 | A | 9/1998 | Tock | |
| 5,819,028 | A | 10/1998 | Manghirmalani et al. | 395/185.1 |
| 5,845,125 | A | 12/1998 | Nishimura et al. | 395/704 |
| 5,850,388 | A | 12/1998 | Anderson et al. | 370/252 |
| 5,870,540 | A | 2/1999 | Wang et al. | 395/183.19 |
| 5,896,536 | A | 4/1999 | Lindsey | 395/704 |
| 5,901,315 | A | 5/1999 | Edwards et al. | 395/704 |
| 5,923,834 | A | 7/1999 | Thieret et al. | 395/183.01 |
| 5,948,113 | A | 9/1999 | Johnson et al. | 714/38 |
| 5,956,662 | A | 9/1999 | Hemker et al. | 702/182 |
| 5,974,237 | A | 10/1999 | Shurmer et al. | 395/200.54 |
| 5,974,457 | A | 10/1999 | Waclawsky et al. | 709/224 |
| 5,978,594 | A | 11/1999 | Bonnell et al. | 395/837 |
| 5,987,249 | A | 11/1999 | Grossman et al. | 395/704 |
| 5,991,881 | A | 11/1999 | Conklin et al. | 713/201 |
| 6,021,437 | A | 2/2000 | Chen et al. | 709/224 |
| 6,026,234 | A | 2/2000 | Hanson et al. | 395/704 |
| 6,026,237 | A | 2/2000 | Berry et al. | 395/704 |
| 6,028,842 | A | 2/2000 | Chapman et al. | 370/235 |
| 6,042,614 | A | 3/2000 | Davidson et al. | 717/4 |
| 6,044,335 | A | 3/2000 | Ksendzov | 702/182 |
| 6,058,102 | A | 5/2000 | Drysdale et al. | 370/252 |
| 6,058,393 | A | 5/2000 | Meier et al. | 707/10 |
| 6,061,518 | A | 5/2000 | Hoffman | 395/704 |
| 6,067,412 | A | 5/2000 | Blake et al. | 395/672 |
| 6,072,777 | A | 6/2000 | Bencheck et al. | 370/244 |
| 6,073,089 | A | 6/2000 | Baker et al. | 702/185 |
| 6,076,083 | A | 6/2000 | Baker | 706/52 |
| 6,081,797 | A | 6/2000 | Hittt | 706/25 |
| 6,085,029 | A | 7/2000 | Kolawa et al. | 395/183.14 |
| 6,106,572 | A | 8/2000 | Halpern | 717/4 |
| 6,108,800 | A | 8/2000 | Asawa | 714/47 |
| 6,115,393 | A | 9/2000 | Engel et al. | 370/469 |
| 6,118,936 | A | 9/2000 | Lauer et al. | 395/200.53 |
| 6,118,940 | A | 9/2000 | Alexander, III et al. | 395/704 |
| 6,119,074 | A | 9/2000 | Sarangapani | 702/185 |
| 6,119,247 | A | 9/2000 | House et al. | 714/38 |
| 6,138,122 | A | 10/2000 | Smith et al. | 707/103 |
| 6,139,198 | A | 10/2000 | Danforth et al. | 395/704 |
| 6,145,121 | A | 11/2000 | Levy et al. | 717/4 |
| 6,149,318 | A | 11/2000 | Chase et al. | 395/704 |
| 6,151,701 | A | 11/2000 | Humphreys et al. | 717/4 |
| 6,154,736 | A | 11/2000 | Chickering et al. | 706/59 |
| 6,161,200 | A | 12/2000 | Rees et al. | 714/38 |
| 6,167,398 | A | 12/2000 | Wyard et al. | 707/5 |
| 6,182,022 | B1 * | 1/2001 | Mayle et al. | 702/182 |
| 6,182,157 | B1 | 1/2001 | Schlener et al. | 709/318 |
| 6,216,119 | B1 | 4/2001 | Jannarone | 706/26 |
| 6,222,652 | B1 | 4/2001 | Roberts | 359/110 |
| 6,249,755 | B1 | 6/2001 | Yemini et al. | 702/183 |
| 6,263,298 | B1 | 7/2001 | Kerman et al. | 702/186 |
| 6,269,401 | B1 | 7/2001 | Fletcher et al. | 709/224 |
| 6,320,585 | B1 | 11/2001 | Engel et al. | 345/440 |
| 6,327,550 | B1 | 12/2001 | Vinberg et al. | 702/186 |
| 6,327,677 | B1 | 12/2001 | Garg et al. | 714/37 |
| 6,359,976 | B1 | 3/2002 | Kalyanpur et al. | 379/134 |
| 6,377,907 | B1 | 4/2002 | Waclawski | 702/182 |
| 6,381,306 | B1 | 4/2002 | Lawson et al. | 379/32.01 |
| 6,405,250 | B1 | 6/2002 | Lin et al. | 709/224 |
| 6,446,058 | B1 | 9/2002 | Brown | 706/60 |
| 6,453,346 | B1 | 9/2002 | Garg et al. | 709/224 |
| 6,466,929 | B1 | 10/2002 | Brown et al. | 706/48 |
| 6,470,464 | B1 | 10/2002 | Bertram et al. | 714/37 |
| 6,484,129 | B1 | 11/2002 | Klein et al. | 702/186 |
| 6,505,246 | B1 | 1/2003 | Land et al. | 709/224 |
| 6,513,065 | B1 | 1/2003 | Hafez et al. | 709/224 |
| 6,557,035 | B1 * | 4/2003 | McKnight | 709/224 |
| 6,615,259 | B1 * | 9/2003 | Nguyen et al. | 709/224 |
| 6,658,367 | B1 * | 12/2003 | Conrad | 702/176 |
| 6,792,456 | B1 * | 9/2004 | Hellerstein et al. | 709/224 |
| 6,810,356 | B1 * | 10/2004 | Garcia-Franco et al. | 702/179 |
| 6,836,800 | B1 * | 12/2004 | Sweet et al. | 709/224 |
| 2001/0052087 | A1 | 12/2001 | Garg et al. | 714/37 |
| 2002/0012011 | A1 | 1/2002 | Roytman et al. | 345/736 |
| 2002/0019870 | A1 | 2/2002 | Chirashnya et al. | 709/224 |
| 2002/0049838 | A1 | 4/2002 | Sylor et al. | 709/224 |
| 2002/0054169 | A1 | 5/2002 | Richardson | 345/854 |
| 2002/0090134 | A1 | 7/2002 | Van Zon | 382/181 |
| 2002/0095661 | A1 | 7/2002 | Angel et al. | 717/130 |
| 2002/0111755 | A1 | 8/2002 | Valadarsky et al. | 702/58 |
| 2002/0123865 | A1 | 9/2002 | Whitney et al. | 702/189 |
| 2002/0133757 | A1 | 9/2002 | Bertram et al | 714/47 |
| 2002/0152185 | A1 | 10/2002 | Jamadagni | 706/1 |
| 2002/0152305 | A1 | 10/2002 | Jackson et al. | 709/224 |
| 2002/0158918 | A1 | 10/2002 | Feibush et al. | 345/853 |
| 2002/0159386 | A1 | 10/2002 | Grosdidier et al. | 370/229 |
| 2002/0165892 | A1 | 11/2002 | Grumann et al. | 709/100 |
| 2002/0169870 | A1 | 11/2002 | Vosseler et al. | 709/224 |
| 2002/0173997 | A1 | 11/2002 | Menard et al. | 705/7 |
| 2002/0174174 | A1 | 11/2002 | Ramraj et al. | 709/203 |
| 2002/0183972 | A1 | 12/2002 | Enck et al. | 702/186 |
| 2002/0184065 | A1 | 12/2002 | Menard et al. | 705/7 |
| 2002/0184615 | A1 | 12/2002 | Sumner et al. | 717/130 |
| 2002/0198879 | A1 | 12/2002 | Schwarcz | 707/10 |
| 2002/0198985 | A1 | 12/2002 | Fraenkel et al. | 709/224 |
| 2003/0005362 | A1 | 1/2003 | Miller et al. | 714/27 |
| 2003/0009507 | A1 | 1/2003 | Shum | 709/104 |
| 2003/0014692 | A1 | 1/2003 | James et al. | 714/25 |
| 2003/0018241 | A1 | 1/2003 | Mannheimer | 600/300 |
| 2003/0018494 | A1 | 1/2003 | Bronstein et al. | 705/2 |
| 2003/0023712 | A1 | 1/2003 | Zhao et al. | 709/223 |
| 2003/0028631 | A1 | 2/2003 | Rhodes | 709/224 |
| 2003/0033404 | A1 | 2/2003 | Richardson | 709/224 |

FOREIGN PATENT DOCUMENTS

| | | |
|---|---|---|
| EP | 0 508 386 A2 | 10/1992 |
| FR | 2 783 620 A | 3/2000 |
| WO | WO 96/12224 | 4/1996 |
| WO | WO 99/13427 A | 3/1999 |

OTHER PUBLICATIONS

Epstein et al., "Educators's Symposium-Introducing Object-orientedness into a Breadth-first Introductory Curriculum," OOPSLA 1992, Addendum to the Proceedings, Vancouver, British Columbia, Canada, Oct. 5-10, 1992, pp. 293-298.

Parthasarathy, et al., "NetProf: Network-based High-level Profiling of Java Bytecode," The University of Rochester Computer Science Department, May 1996, pp. 1-15.

Han Bok Lee, "BIT: A Tool for Instrumenting Java Bytecodes," Department of Colorado Science, Aug. 1997, pp. 73-82.

"Jikes Bytecode Toolkit," IBM Internet Web-site, May 2000, pp. 1-2.

Cuéllar, J, "Statistical Process Control for Nonnormally Distributed Variables Through the Use of Transformations," Advanced Semiconductor Manufacturing Conference and Workshop, 1991. ASMC 91 Proceedings. IEEE/SEMI 1991 Boston, MA, USA; Oct. 21-23, 1991, New York, NY, USA, IEEE, US, Oct. 21, 1991, pp. 143-148.

Engineering Statistical Handbook, Online, "Anderson-Darling Test," Apr. 17, 2001, pp. 1-5.

Engineering Statistical Handbook, Online, "Chi Square Goodness-of-Fit Test," Jun. 25, 2001, pp. 1-5.

Engineering Statistical Handbook, Online, "What are Moving Average or Smoothing Techniques?," Jul. 13, 2001, pp. 1-4.

Lee, J.L., "Application of Statistical Process Control Methods to the Establishment of Process Alarms in a Distributed Process Control System," ISA Transaction, Instrument Society of America. Pittsburgh, US, vol. 30, No. 1, 1991, pp. 59-64.

Wheeler D.J. et al., "Understanding Statistical Process Control," Chapters 3-4, 1986, Statistical Process Controls, Inc., Knoxville, Tennessee, USA, pp. 41-97.

Thottan, et al., "Adaptive Thresholding for Proactive Network Problem Detection," Rensselaer Polytechnic Institute, Department of Electrical, Computer, and Systems Engineering.

Hellerstein, et al., "Characterizing Normal Operation of a Web Server: Application to Workload Forecasting and Problem Detection," Proceedings of the Computer Measurement Group, 1998.

Peterson, et al., "Fractal Patterns in DASD I/O Traffic."

Grummitt, Adam, "Automated Performance Management Advice Using Computational Intelligence," Metron Technology Limited.

Buzen, et al., "MASF—Multivariate Adaptive Statistical Filtering," BGS Systems, Inc.

Wheeler, Robert E., "Quantile Estimators of Johnson Curve Parameters," E.I. du Pont de Nemours & Co.

Chou, et al., "Transforming Non-Normal Data to Normality in Statistical Process Control," Journal of Quality Technology, 1998, vol. 30, No. 2.

Shapiro, Samuel S., "How to Test Normality and Other Distributional Assumptions," American Society for Quality Control, Statistics Division, 1990.

DataMyte Handbook, "Non-Normal Distributions, Johnson Transformations," DataMyte Business, Allen-Bradley Company, Inc., Chapter 6, 1995.

Gunther, Neil J., "The Practical Performance Analyst—Performance-By-Design Techniques for Distributed Systems," 1998, p. 12-15.

Walpole, et al., "Probability and Statistics for Engineers and Scientists," 1998, p. 213-215, 340-343.

DataMyte Handbook, "Control Charts," Chapter 2; "Constants for Calculating Control Limits," Appendix-Table A-1, DataMyte Business, Allen-Bradley Company, Inc., 1987.

Gilchrist, Warren G., "Statistical Modeling With Quantile Functions," chapter 1—An Overview, p. 1-17; chapter 2—Describing a Sample, p. 43-50, 2000.

Press, et al., "Numerical Recipes in C," Second Edition, chapter 6- Special Functions, p. 212-222; chapter 14- Statistical Description of Data—Nonparametric or Rank Correlation, p. 639-642, 1992.

Evans, et al., "Statistical Distributions," Third Edition, chapter 19- Gamma Distribution, p. 98-105, 2000.

Papoulis, Athanasios, "Probability, Random Variables, and Stochastic Processes," chapter 5—Functions of One Random Variable, p. 116-127, 1965.

Han, et al., "Datat Mining Concepts and Techniques," chapter 8- Cluster Analysis, p. 335-393, 2001.

* cited by examiner

|        |          |          |          |          | Time     |          |          |     |          |
|--------|----------|----------|----------|----------|----------|----------|----------|-----|----------|
| Metric | 09:45:30 | 09:45:29 | 09:45:28 | 09:45:27 | 09:45:26 | 09:45:25 | 09:45:24 | ... | 09:35:31 |
| D      | X        | X        | —        | X        | X        | —        | X        | ... | X        |
| F      | X        | X        | X        | X        | X        | X        | X        | ... | X        |
| M      | X        | X        | X        | X        | X        | X        | X        | ... | X        |
| A      | X        | X        | X        | X        | X        | X        | X        | ... | X        |
| R      | X        | X        | X        | X        | X        | —        | X        | ... | X        |
| W      | X        | X        | X        | X        | X        | X        | X        | ... | X        |
| H      | X        | X        | X        | X        | X        | X        | X        | ... | X        |
| G      | X        | X        | X        | X        | X        | X        | X        | ... | X        |
| C      | X        | X        | X        | X        | X        | X        | X        | ... | X        |
| P      | —        | X        | X        | X        | X        | —        | X        | ... | X        |

SYSTEM AND METHODS FOR ADAPTIVE THRESHOLD DETERMINATION FOR PERFORMANCE METRICS

CROSS-REFERENCE TO RELATED CASES

This application claims priority to and the benefit of, and incorporates herein by reference, in their entirety, the following provisional U.S. patent applications:
Ser. No. 60/307,055, filed Jul. 20, 2001, and
Ser. No. 60/322,021, filed Sep. 13, 2001.

Further, this application incorporates herein by reference, in its entirety, U.S. provisional application Ser. No. 60/307,730, filed Jul. 3, 2001.

FIELD OF THE INVENTION

The invention relates to a system and methods for monitoring a set of metrics. More particularly, the invention provides a system and methods for dynamically computing thresholds, and for signaling threshold violations.

BACKGROUND OF THE INVENTION

Transactions are at the heart of web-based enterprises. Without fast, efficient transactions, orders dwindle and profits diminish. Today's web-based enterprise technology, for example, is providing businesses of all types with the ability to redefine transactions. There is a need, though, to optimize transaction performance and this requires the monitoring, careful analysis and management of transactions and other system performance metrics that may affect web-based enterprises.

Due to the complexity of modern web-based enterprise systems, it may be necessary to monitor thousands of performance metrics, ranging from relatively high-level metrics, such as transaction response time, throughput and availability, to low-level metrics, such as the amount of physical memory in use on each computer on a network, the amount of disk space available, or the number of threads executing on each processor on each computer. Metrics relating to the operation of database systems and application servers, operating systems, physical hardware, network performance, etc. all must be monitored, across networks that may include many computers, each executing numerous processes, so that problems can be detected and corrected when (or preferably before) they arise.

Due to the number of metrics involved, it is useful to be able to call attention to only those metrics that indicate that there may be abnormalities in system operation, so that an operator of the system does not become overwhelmed with the amount of information that is presented. To achieve this, it is generally necessary determine which metrics are outside of the bounds of their normal behavior. This is typically done by checking the values of the metrics against threshold values. If the metric is within the range defined by the threshold values, then the metric is behaving normally. If, however, the metric is outside the range of values defined by the thresholds, an alarm is typically raised, and the metric may be brought to the attention of an operator.

Many monitoring systems allow an operator to set the thresholds beyond which an alarm should be triggered for each metric. In complex systems that monitor thousands of metrics, this may not be practical, since setting such thresholds may be labor intensive and error prone. Additionally, such user-specified fixed thresholds are inappropriate for many metrics. For example, it may be difficult to find a useful fixed threshold for metrics from systems with time varying loads. If a threshold is set too high, significant events may fail to trigger an alarm. If a threshold is set too low, many false alarms may be generated.

In an attempt to mitigate such problems, some systems provide a form of dynamically-computed thresholds using simple statistical techniques, such as standard statistical process control (SPC) techniques. Such SPC techniques typically assume that metric values fit a Gaussian, or "normal" distribution. Unfortunately, many metrics do not fit such a distribution, making the thresholds that are set using typical SPC techniques inappropriate for certain systems.

For example, the values of many performance metrics fit (approximately) a Gamma distribution. Since a Gamma distribution is asymmetric, typical SPC techniques, which rely on a Gaussian or normal distribution, which is symmetric, are unable to set optimal thresholds. Such SPC thresholds are symmetric about the mean, and when applied to metric data that fits an asymmetric distribution, if the lower threshold is set correctly, the upper limit will generally be set too low. If the upper limit is set correctly, then the lower limit will generally be set too low.

Additionally, typical SPC techniques are based on the standard deviation of a Gaussian or normal distribution. There are many performance metrics that exhibit self-similar or fractal statistics. For such metrics, standard deviation is not a useful statistic, and typical SPC techniques will generally fail to produce optimal thresholds.

Many performance metrics exhibit periodic patterns, varying significantly according to time-of-day, day-of-week, or other (possibly longer) activity cycles. Thus, for example, a metric may have one range of typical values during part of the day, and a substantially different set of typical values during another part of the day. Current dynamic threshold systems typically fail to address this issue.

Additionally, current dynamic threshold systems typically ignore data during alarm conditions for the purpose of threshold adjustment. Such systems are generally unable to distinguish between a short alarm burst and a persistent shift in the underlying data. Because of this, such systems may have difficulty adjusting their threshold values to account for persistent shifts in the values of a metric. This may cause numerous false alarms to be generated until the thresholds are reset (possibly requiring operator intervention) to take the shift in the underlying data into account.

SUMMARY OF THE INVENTION

In view of the foregoing, there is a need for a system and methods for dynamically generating alarm thresholds for performance metrics, wherein the metrics may not fit a Gaussian or normal distribution, or may exhibit cyclic behavior or persistent shifts in the values of the metrics. The present invention uses a variety of statistical methods, including statistical process control (SPC) methods, normalization methods, and heuristics to generate such thresholds.

In general, in one aspect, the system establishes one or more default alarm thresholds associated with a metric, repeatedly receives data associated with the metric, statistically analyzes the received data to establish one or more updated alarm thresholds, and triggers an alarm on receipt of data that violates one or more updated thresholds. By basing the updated alarm thresholds on a statistical analysis of the metric data, the system is able to update one or more thresholds dynamically, based on the values of the metric.

In one embodiment the statistical analysis determines whether the received data fits a normal distribution (i.e., the data is normal). This may be done in embodiments of the invention by applying a chi-square test to the received data, by applying an Anderson-Darling test to the received data, or by applying both these tests and combining the results. If the data is determined to fit a normal distribution, it is categorized as "normal." One embodiment uses SPC techniques to compute the thresholds for data that is categorized as normal.

In one embodiment of the invention, if the data is not normal, the system determines whether the data is normalizable. One embodiment makes this determination by operating on the received data with a function representing the estimated cumulative distribution of the received data, and then using the quantile function of a normal distribution to attempt to normalize the data. If this is successful, the data is categorized as "normalizable." If the data is normalizable, one embodiment normalizes the data, and then uses SPC techniques to calculate one or more thresholds. When these thresholds are later applied, it may be necessary to first normalize the data.

In one embodiment, if the data is not normal, and is not normalizable, then the data is categorized as "non-normal," and heuristic techniques may be used to determine one or more thresholds. As part of these heuristic techniques, embodiments of the invention may use combinations of statistical techniques, including weighted linear regression techniques, and techniques based on a quantile function.

By categorizing the data as normal, normalizable, or non-normal, and applying different techniques to compute one or more thresholds, the dynamic threshold calculation of the present invention is able to compute one or more thresholds for data that does not fit a Gaussian or normal distribution.

In one embodiment, the statistical analysis is repeated, and one or more updated alarm thresholds are updated based on previous values of the alarm thresholds. This permits the system to handle metrics that are cyclic in nature, or that have persistent shifts in the values of their data. In one embodiment, this may be achieved by applying a filter in the computation of one or more updated thresholds. In one embodiment this filter uses a weighted sum of data that may include historical data, a statistical summarization of metric data, metric data associated with a predetermined time period, or any combination thereof. In one embodiment, after the filter is applied, one or more thresholds may be computed using SPC techniques or heuristic techniques, depending on the category of the data, as discussed above.

Embodiments of the invention may test data against one or more thresholds to trigger alarms using a variety of methods. For some metrics, use of fixed alarms may be appropriate, and for these metrics the received data is compared with one or more fixed thresholds to determine whether an alarm should be triggered. In some embodiments, if the metric was determined to be normal, then the mean and standard deviation of the received data may be checked against one or more alarm thresholds to determine if an alarm should be triggered.

In some embodiments, when the metric was determined to be normalizable, then the received data is normalized. The mean and standard deviation of the normalized data are then compared against one or more thresholds to determine whether an alarm should be triggered.

In some embodiments, when the metric was determined to be non-normal, then the mean of the received data is compared to one ore more thresholds determined by heuristic techniques. If the mean falls outside of the range of values defined by the threshold(s), then an alarm is triggered.

In some embodiments, the methods of dynamically computing and applying one or more thresholds can be implemented in software. This software may be made available to developers and end users online and through download vehicles. It may also be embodied in an article of manufacture that includes a program storage medium such as a computer disk or diskette, a CD, DVD, or computer memory device. The methods may also be carried out by an apparatus that may include a general-purpose computing device, or other electronic components.

Other aspects, embodiments, and advantages of the present invention will become apparent from the following detailed description which, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 15 shows an example of arrangement of metric sample data in time slots, and identification of time slots in which some data is missing, in accordance with an embodiment of the invention;

In the drawings, like reference characters generally refer to the same parts throughout the different views. The drawings are not necessarily to scale, emphasis instead being placed on illustrating the principles of the invention.

DETAILED DESCRIPTION OF THE INVENTION

Figure 1:
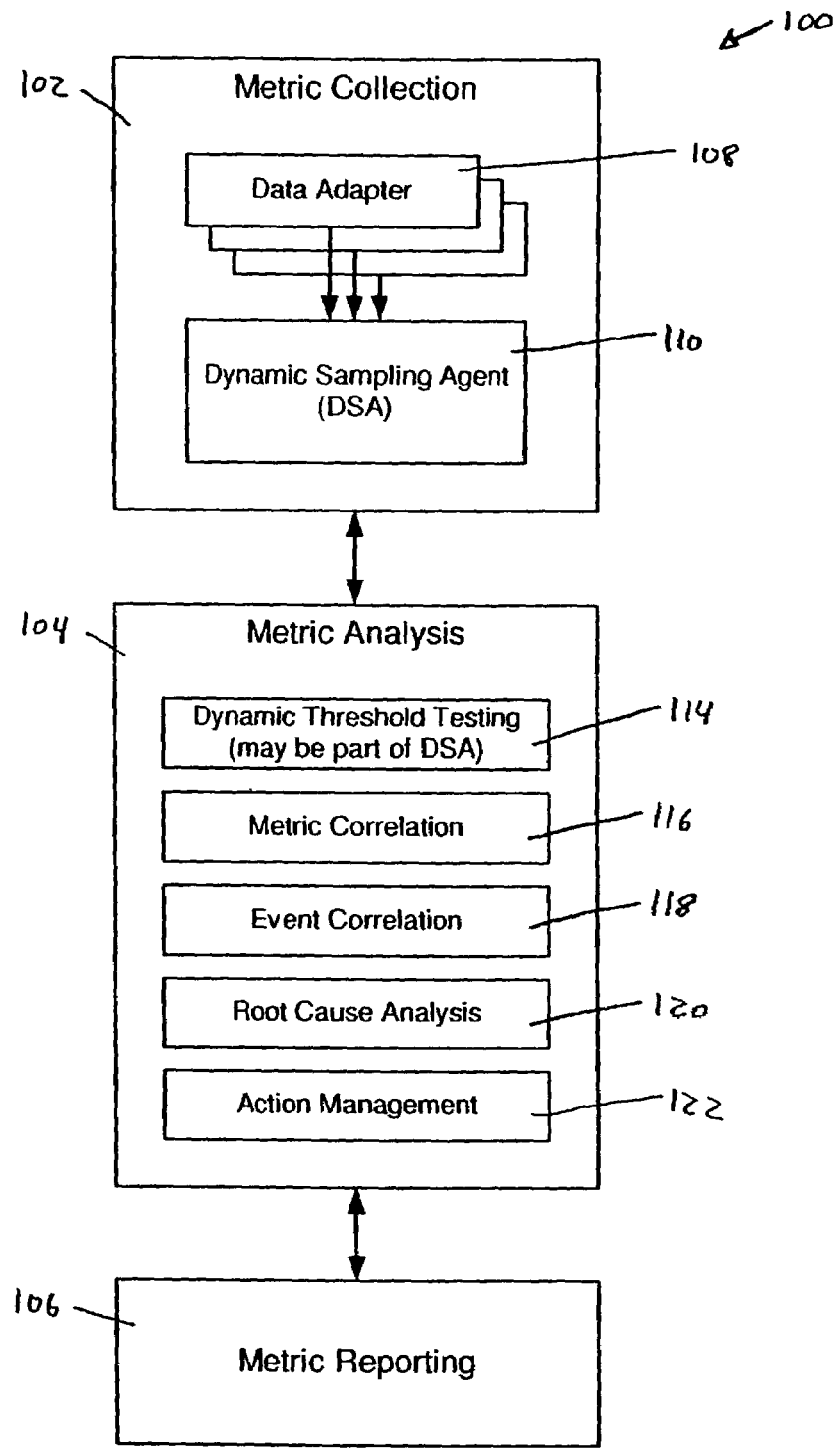
FIG. 1 is an overview of a system for collecting, analyzing, and reporting metrics, in accordance with an embodiment of the present invention.

As shown in the drawings for the purposes of illustration, the invention may be embodied in a system that collects, analyzes, and reports performance metrics for systems such as, for example, complex transaction-based structures typified by (but not limited to) e-commerce systems. A system according to the invention provides the capability to discern, group, and highlight performance information that facilitates the efficient operation and control of the monitored system. A system manager presented with information so organized is relieved from the difficulties associated with visualizing and interpreting what appears to be a large amount of unrelated data.

In brief overview, embodiments of the present invention provide a system and methods for collecting, analyzing and reporting on significant irregularities with respect to a set of system performance metrics. These metrics are collected from the various sub-systems that make up, for example, an e-commerce transaction processing system. Typical metrics include measures of CPU and memory utilization, disk transfer rates, network performance, process queue depths and application module throughput. Key performance indicators at the business level, such as transaction rates and round-trip response times are also monitored. Statistical analysis is used to detect irregularities in individual metrics. Correlation methods are used to discover the relationship between metrics. The status of the system is presented via a graphical user interface that highlights significant events and provides drill-down and other visual tools to aid in system diagnosis.

The system and methods of the present invention are described herein as applying to software for use by a system manager, such as an web-based enterprise system manager, to assist, for example, in the achievement and maintenance of Service Level Agreements in terms of system performance. It will be understood that the system and methods of the present invention are not limited to this application, and can be applied to the control and maintenance of most any system whose operation can be described through use of a set of system metrics.

Referring to FIG. 1, an overview of an embodiment of a system according to the present invention is described. System 100 includes metric collection module 102, metric analysis module 104, and reporting module 106.

Metric collection module 102 includes one or more data adapters 108, installed in the systems to be monitored. Each data adapter 108 collects information relating to the metrics that are being monitored from a particular sub-system, such as an operating system, web server, or database server. The data adapters 108 transmit their information to a dynamic sampling agent 110, which collects the metrics, performs fixed and statistical threshold checks, and sends both the metric data and threshold alarm events to metric analysis module 104.

Metric Analysis module 104 performs progressive information refinement on the metrics that are being monitored. Analysis module 104 includes dynamic threshold testing component 114, and metric correlation component 116, as well as optional components, such as event correlation component 118, root cause analysis component 120, and action management component 122. In one embodiment, dynamic threshold testing component 114 is part of dynamic sampling agent 110, for reasons of scalability and efficiency, while the other components of metric analysis module 104 act as plug-in components of a central service management platform.

Dynamic threshold testing component 114 detects when individual metrics are in abnormal condition, producing threshold alarm events. It uses both fixed, user-established thresholds and thresholds derived from a statistical analysis of the metric itself. Dynamic threshold testing component 114 includes a fixed threshold check module, a dynamic threshold check module, and a dynamic threshold computation module, as will be discussed in detail below in the section entitled "Adaptive Threshold Determination."

Metric correlation component 116 analyzes pairs of metric values collected from one or more dynamic sampling agent 110. It applies various correlation and regression techniques to determine the statistical relationship between pairs of metrics, and to form groups of closely related metrics. It also tries to determine temporal relationship between metrics. Metric correlation component 116 will be described in detail below, in the section entitled "Adaptive Metric Grouping."

Event correlation component 118 receives threshold alarms events from the synamic sampling agent(s) 110. It uses a set of rules to convert groups of related events into a single Significant Event. The rules include use of techniques such as event counting, temporal analysis, pattern recognition, and event promotion.

Root cause analysis component 120 applies threshold alarm events and the results of metric correlation component 116 to build and maintain a Bayesian belief network that is used to determine the most likely root cause of Significant Events. When a set of likely root causes is determined, this component generates a root cause event.

Action management component 122 uses rule-based reasoning to take action on root cause events. Such action may include suppressing the event, notifying the system manager, sending e-mail, or executing a script.

Metric reporting module 106 provides a user, such as a system manager, with detailed reporting on the metrics, alarms, and analysis performed by the system. In one embodiment, reporting module 106 uses a 3D graphical user interface that provides for drill-down exploration of metric data and analysis, permitting, for example, exploration of the activity that caused an abnormal or suspicious condition in the system being monitored. Additionally, graphical tools may be used in reporting module 106 to display a time history of sets of related metrics. Other interfaces and reports, such as 2D graphical interfaces or printed activity reports and charts may also be provided by reporting module 106. In one embodiment, reporting module 106 permits an operator to monitor the system remotely, over a web connection.

Adaptive Threshold Determination

Figure 2:
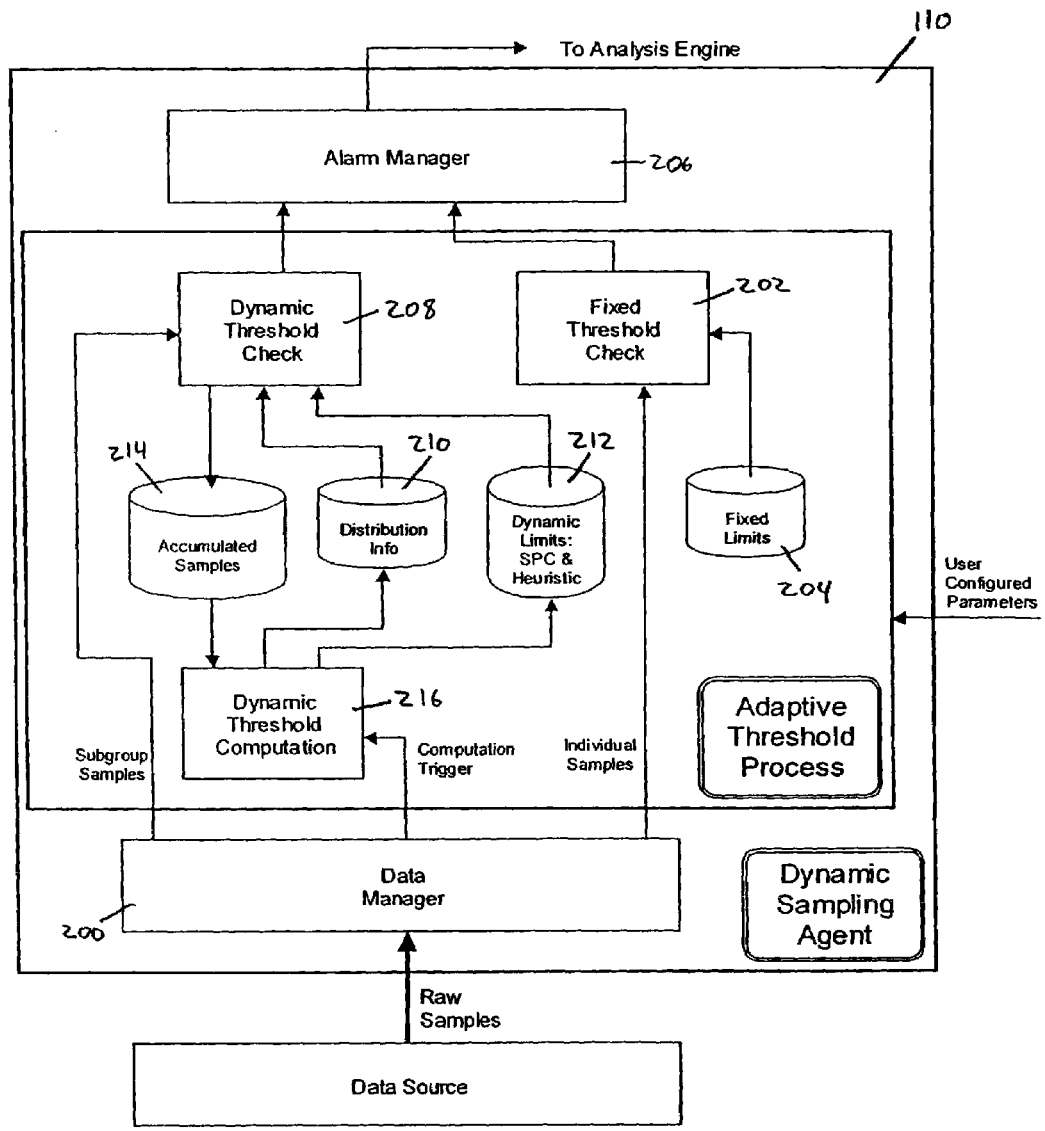
FIG. 2 is an overview of a dynamic sampling agent in accordance with an embodiment of the invention.

Referring now to FIG. 2, a more detailed view of dynamic sampling agent 110 is described. Dynamic sampling agent 110 includes data manager 200, which provides individual samples of performance metrics that have fixed thresholds to fixed threshold check module 202. Fixed threshold check module 202 compares each sample value against fixed limits, which are retrieved from fixed limit store 204, and signals alarm manager 206 if a limit is violated. The fixed limits are generally configured by an operator, and typically cannot be automatically changed by the system. Such fixed (or static) threshold limits are useful crosschecks for thresholds with natural upper or lower bounds, such as disk space, or key metrics that have required limits, such as response time.

Data manager 200 also provides small sets (or subgroups) of consecutive samples to dynamic threshold check module 208, which compares the statistics of each such subgroup against previously computed dynamic thresholds, which are stored in distribution information store 210 and dynamic limit store 212. The individual samples are also accumulated and temporarily stored in accumulated samples store 214.

Periodically, data manager 200 signals dynamic threshold computation module 216 to compute new thresholds. As will be described in greater detail below, dynamic threshold computation module 216 first classifies the data based on the statistics of the accumulated samples into one of three types: normal, normalizable or non-normal. For normal data, provisional thresholds are computed using standard statistical process control techniques. For normalizable data, the probability distribution of the metric is estimated from the accumulated samples. The estimated distribution is stored in distribution information store 210, and is used to transform the samples into normally distributed values. Standard statistical process control (SPC) techniques are applied to the transformed samples to compute provisional thresholds. For non-normal data, the thresholds are computed using a heuristic technique, which combines linear regression with the quantile function of the stored samples.

These provisional thresholds are modified by a baseline filtering process. This process records the history of the threshold statistics and uses it to filter new threshold estimates. In this way, the process can adapt to cyclic patterns of activity, producing thresholds that cause far fewer false alarms, and yet remain sensitive to unexpected shifts in the metric statistics. The new threshold levels are stored in dynamic limit store 212, for use in subsequent sample checks.

It will be understood by one skilled in the relevant arts that the various components and modules of dynamic sampling agent 110 may be implemented as programmed code that causes a general-purpose computing device, such as a digital computer, to perform the functions described, effectively transforming the general-purpose computing device into each of the components or modules as the programmed code is executed. Alternatively, the components and modules of dynamic sampling agent 110 may be embodied in a combination of electronic components, such as logic gates, transistors, registers, memory devices, programmable logic devices, or other combinations of devices that perform the described functions.

Figure 3:
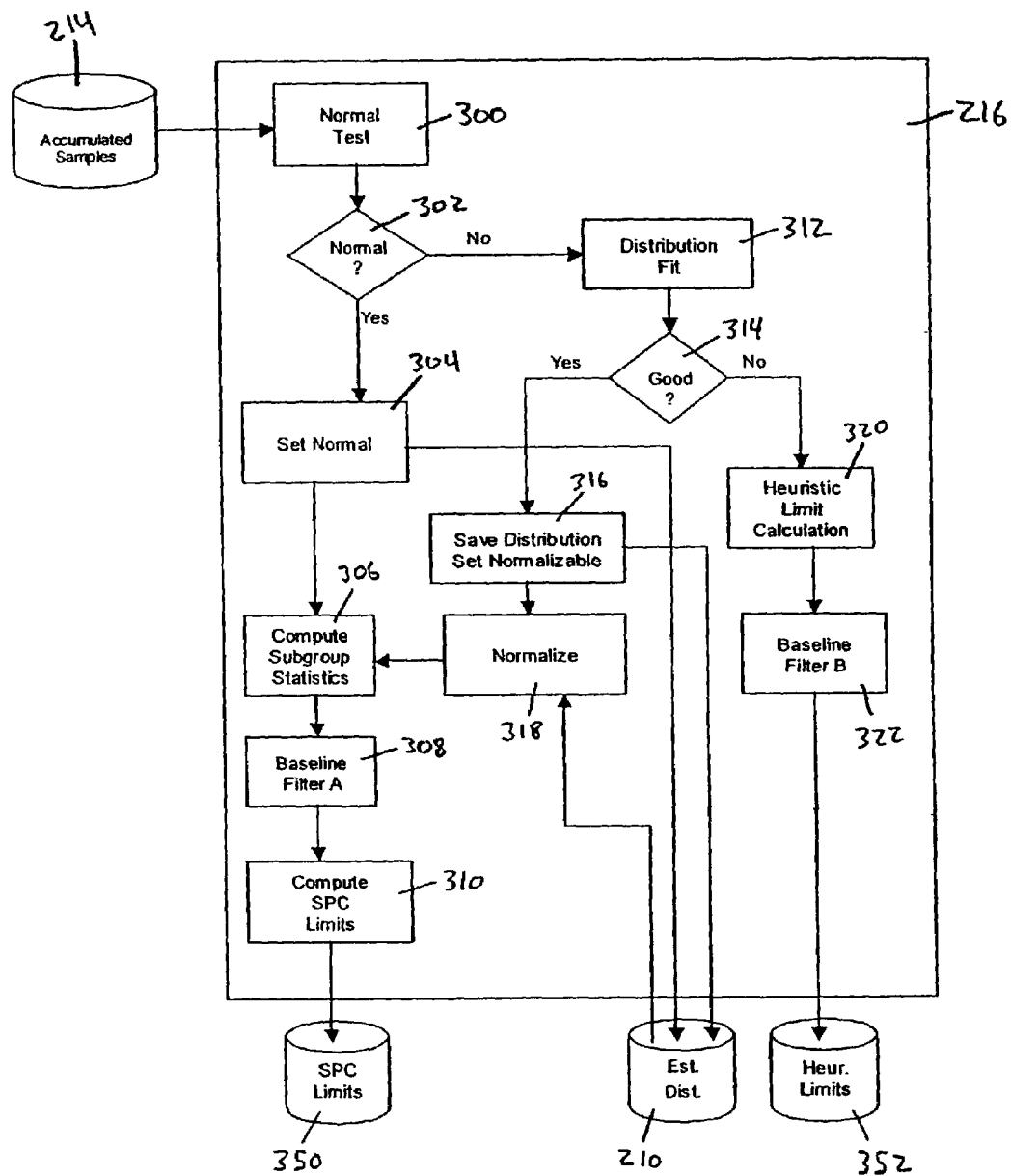
FIG. 3 is a flowchart of the operation of a dynamic threshold computation module in accordance with an embodiment of the invention.

FIG. 3 shows a flowchart of the operation of dynamic threshold computation module 216. Dynamic threshold computation module 216 takes accumulated data from accumulated samples store 214 at a predetermined time interval triggered by the data manager 200, and computes new metric threshold limits to fit the current time of day, week, or month, independently or as a group.

At a predetermined interval (for example, hourly) samples for a metric from accumulated samples store 214 are sent to dynamic threshold computation module 216. These samples are typically divided into a number of subgroups, in which each subgroup typically contains a predetermined number of samples. For example, a subgroup may consist of ten values of a metric, sampled at a rate of one value per second, over ten seconds. In this example there would be 360 subgroups per hour collected for each metric. In this example, every half-hour, a list containing the values for a metric over the last hour (typically 3600 values) may be sent to dynamic threshold computation module 216.

At step 300 a normal test is applied to the samples, to determine whether the samples of metric data provided to dynamic threshold computation module 216 fit a normal distribution, and the metric may be classified as "normal." To make this determination, the normal test that is executed in step 300 uses a combination of the chi-square test and the Anderson-Darling test on a specially formed histogram of the metric data. The chi-square ($x^2$) test is a well-known distribution test that is utilized here to compare accumulated samples to the probability density function (PDF) of normal data. The Anderson-Darling test is a more sensitive test that is used to compare the cumulative distribution function (CDF) of accumulated data to the CDF of normal data. If either of these tests gives a strong indication of non-normal distribution, the normal test 300 fails. If both give a weak indication of a non-normal distribution, the normal test 300 also fails, otherwise the data is assumed to be normal.

If the data fit a normal distribution (step 302), then at step 304, the system sets a flag indicating that the data for the metric in question are normal, and stores the flag in distribution information store 210 for use by dynamic threshold check module 208.

Next, in step 306, mean and standard deviation values are computed for each subgroup as well as the estimated mean and standard deviation over all of the subgroups. The following formulas are used to compute these values:

Given the set of subgroups $\{\mu_j, \sigma_j\}$, where N=the number of elements in each subgroup, M=the number of subgroups, j=the subgroup number, i=the sample number within a subgroup, compute:

| | | |
|---|---|---|
| $\mu_j = [\Sigma x_i]/N$ | subgroup mean | (Eq. 1) |
| $\sigma_j = \sqrt{[\Sigma(x_i - \mu_j)^2]/(N-1)}$ | subgroup standard deviation | (Eq. 2) |
| $\mu = [\Sigma \mu_j]/M$ | average mean over all subgroups | (Eq. 3) |
| $\sigma = [\Sigma \sigma_j]/M$ | average standard deviation over all subgroups | (Eq. 4) |

In step 308 a baseline filter (baseline filter A) uses the recent history of the statistics of the metrics to filter the estimated mean and standard deviation over all of the subgroups. This computation uses, for example, a record of the parameters needed to compute thresholds for each hour of each day of the week for up to a user-specified number of weeks. As described below, it produces a decaying weighted sum of the values for a particular time slot for each of the weeks available. This acts to filter the values and give memory of recent history of the metrics, so that the thresholds are more stable, and more sensitive to longer-term changes. Using this type of filtering permits the thresholds to adapt to regular (e.g., weekly) patterns of activity.

Using this baseline filer, the value to be calculated, V', may be computed using the following formula:

$$V' = (w_c * v_c) + (w_h * v_h) + (w_d * v_d) + \sum_{j=1}^{N}(w_j * v_j) \quad \text{(Eq. 5)}$$

Where:
V'=filtered value for mean (μ) or standard deviation (σ)
$w_c$=weight for current value
$v_c$=current value
$w_h$=weight for value from previous hour
$v_h$=value from previous hour
$w_d$=weight for current hour of previous day
$v_d$=value from current hour of previous day
$w_j$=weight for current hour of same day of previous week # j
$v_j$=value for current hour of same day of previous week # j
j=number of weeks previous to the current week
N=number of weeks of available history (user specified)
Note: $w_j$'s typically decrease as one goes back in time.

Next, in step 310, upper and lower control limits are computed using the filtered values of the mean and standard deviation. These limits are referred to as SPC limits, because they are computed using standard statistical process control (SPC) techniques. To compute the SPC limits, the following formulas are used:

$$c4 = E(s)/\sigma = \sqrt{2/(N-1)} * \Gamma(N/2)/\Gamma((N-1)/2) \quad \text{(Eq. 6)}$$

$$\text{var}(s) = \sigma^2/(1-c4^2) \quad \text{(Eq. 7)}$$

$$A3 = 3.0/(c4*\sqrt{N}) \quad \text{(Eq. 8)}$$

$$B3 = 1.0 - (3.0/c4)\sqrt{1-c4^2} \quad \text{(Eq. 9)}$$

$$B4 = 1.0 + (3.0/c4)\sqrt{1-c4^2} \quad \text{(Eq. 10)}$$

$$LCL\_X = \mu - A3*\sigma \quad \text{(Eq. 11)}$$

$$UCL\_X = \mu + A3*\sigma \quad \text{(Eq. 12)}$$

$$LCL\_S = B3*\sigma \quad \text{(Eq. 13)}$$

$$UCL\_S = B4*\sigma \quad \text{(Eq. 14)}$$

Where:
N is the number of samples;
s is the estimated standard deviation;
E(s) is the expected value of s;
var(s) is the variance of s;
LCL_X is the lower control limit for the mean;
UCL_X is the upper control limit for the mean;
LCL_S is the lower control limit for the standard deviation;
UCL_S is the upper control limit for the standard deviation; and Γ(z) is the Gamma Function, a standard function defined as:

$$\Gamma(z) = \int t^{z-1} e^{-t} dt \text{ where the integral is from 0 to } \infty \quad \text{(Eq. 15)}$$

Note: The factors c4, A3, B3, B4 depend only on N, so they are usually pre-computed and stored in a table.

Once the SPC limits are computed, they are stored in SPC limits store 350, which, in one embodiment, is a portion of dynamic limit store 212. The SPC limits may be used by dynamic threshold check module 208.

Figure 4A:
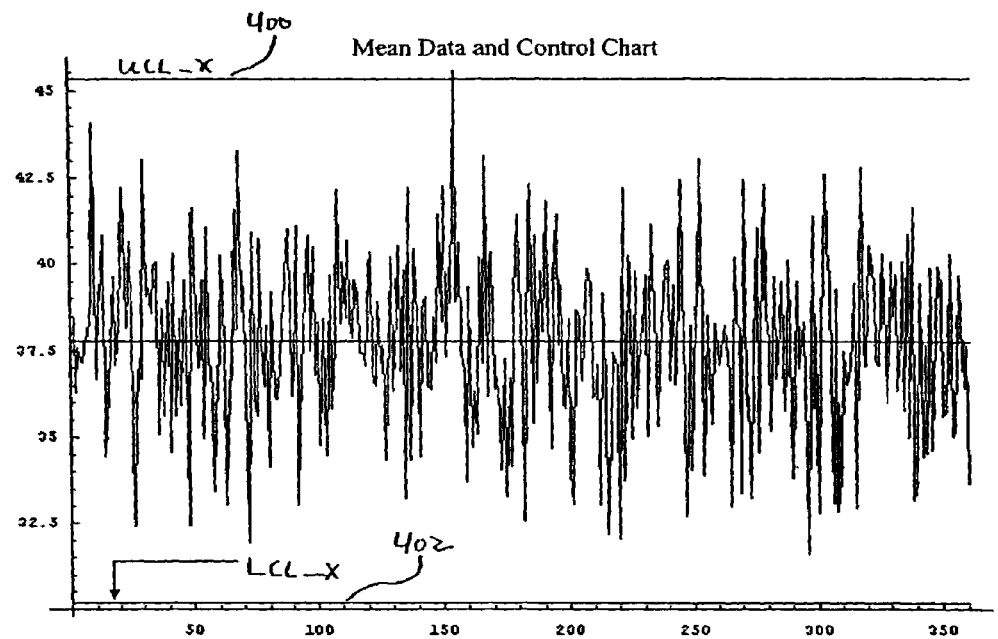
FIGS. 4A and 4B are graphs showing examples of upper and lower mean threshold limits, and upper and lower standard deviation threshold limits, respectively, in accordance with an embodiment of the invention.
Figure 4B:
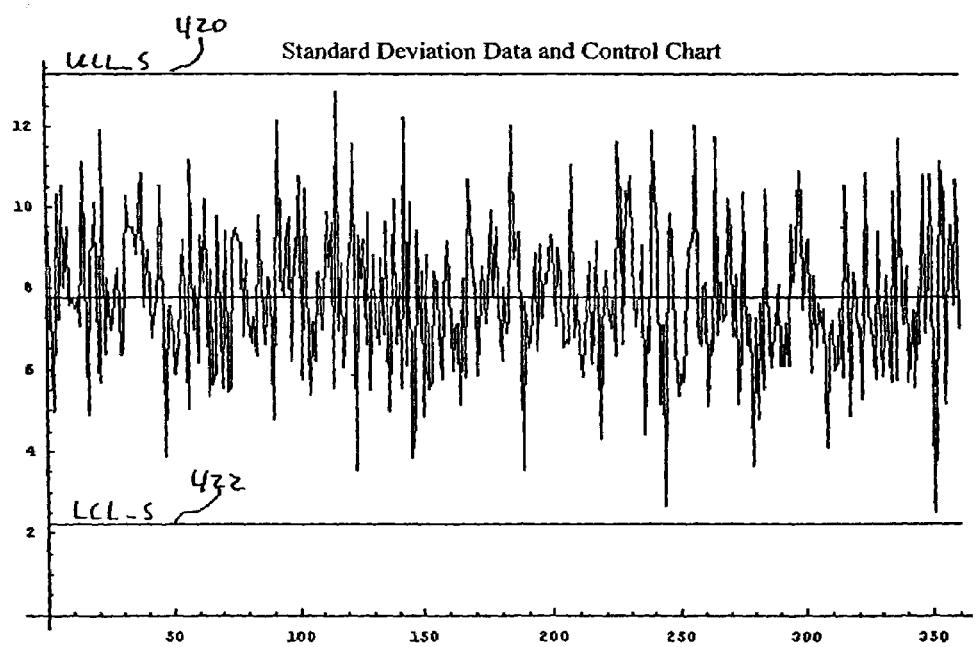

FIGS. 4A and 4B show plots for 360 subgroups of metric sample data with updated upper and lower control limits. In FIG. 4A, the mean values for 360 subgroups are shown, as well as control limits for the mean, UCL_X 400 and LCL_X 402. FIG. 4B shows a similar chart, with the standard deviation values for 360 subgroups, and the control limits for the standard deviation, UCL_S 420 and LCL_S 422.

Referring again to FIG. 3, in step 312, if the normal test indicated that the data did not fit a normal distribution, the system uses distribution fit methods to attempt to fit the data to one of several standard probability distributions, such as a gamma distribution, a beta distribution, a Weibull distribution, and other known statistical distributions.

For example, for a gamma distribution, the system computes the mean and standard deviation, and then uses known statistical methods to estimate the parameters α, β, and γ, which determine the shape, scale, and origin of the gamma distribution, respectively. A chi-square test, similar to the test used in the normal distribution test, described below, but with histogram bin counts that are computed against the probability density function of the estimated distribution, is used to assess the fit between the data and the estimated distribution. The resulting chi-square value is checked against critical values, which can be found in a standard chi-square table to determine whether the fit is good.

If the fit is good (step 314), in step 316, the distribution is saved and a flag is set indicating that the data is normalizable. The estimated distribution parameters (such as the mean, standard deviation, shape, scale, and origin for a gamma distribution) and the flag are stored in distribution information store 210.

In step 318, the data is transformed into a normally distributed dataset. This is done by (1) passing data through the function representing its estimated cumulative distribution, and then (2) passing that result through the quantile function of a normal distribution.

For example, for the gamma distribution, the cumulative distribution function (CDF) may be derived using known statistical techniques, based the estimated shape, scale, and origin parameters from distribution information store 210. Once the CDF has been derived, the probability $P_i$ can be found for each sample $x_i$ that represents the portion of values expected to be less than $x_i$. $P_i$ may be computed using:

$$P_i = CDF(x_i) \quad \text{(Eq. 16)}$$

Since the CDF represents the distribution of the $x_i$, the values of $P_i$ will be uniformly distributed in the range (0,1).

Next, the quantile function of the normal distribution $Q_N$ will be computed using known statistical techniques from the estimated mean and standard deviation values that were stored in distribution information store 210. For each probability $P_i$, a new sample value $Z_i$ is computed using:

$$Z_i = Q_N(P_i) \quad \text{(Eq. 17)}$$

The non-normal data samples $x_i$ have been transformed into normal samples $Z_i$ by the path:

$$x_i \rightarrow P_i \rightarrow Z_i$$

Once the data have been normalized in step 318, the system proceeds to step 306, to compute subgroup statistics, apply a baseline filter, and compute SPC limits, as described above. As with data that fit the normal distribution, the computed limits are stored in SPC limits store 350.

In step 320, if a good fit was not found for the data, upper and lower threshold limits for the mean are calculated using a statistical method based on the sample or empirical quantile function of the means. This process of heuristic limit calculation will be described in greater detail below.

In step 322, a baseline filter (baseline filter B) is used, along with the recent history of the limits, to filter the limit values so the thresholds adapt to regular patterns of activity. Baseline filter B, used in step 322, is similar to baseline filter A, used in step 308, and may be expressed using the following formula:

$$V' = (w_c * v_c) + (w_h * v_h) + (w_d * v_d) + \sum_{j=1}^{N}(w_j * v_j) \quad \text{(Eq. 18)}$$

Where:
$V'$=filtered value for the upper threshold limit or the lower threshold limit;
$w_c$=weight for current value;
$v_c$=current value;
$w_h$=weight for value from previous hour;
$v_h$=value from previous hour;
$w_d$=weight for current hour of previous day;
$v_d$=value from current hour of previous day;
$w_j$=weight for current hour of same day of previous week # j;
$v_j$=value for current hour of same day of previous week # j;
j=number of weeks previous to the current week; and
N=number of weeks of available history (user specified).
Note: $w_j$'s decrease as one goes back in time.

The adjusted upper and lower threshold limits for the mean are stored in heuristic limits store 352, which, in one embodiment, is a portion of dynamic limits store 212. These threshold limits can then be accessed by dynamic threshold check module 208.

As an example of the baseline filter (baseline filter B) used in step 322 (a similar filter is also used in step 308), suppose that the system starts up on Wednesday Jul. 4, 2001, at 12:00:00. At 13:00:00 dynamic threshold computation module 216 calculates an upper threshold value, value$_0$, on data for Metric X. This upper limit is based on metric data from 12:00:01–13:00:00. In the baseline filter step, value$_c$ is not multiplied by a weight factor because there is no historical data. So, the upper threshold limit for Metric X at 13:00:00 is computed by:

$$Value_{h,U} = w_c * v_c$$
$$= 1.0 * v_c$$

(Note that when the system first starts up, there are no histories saved so $w_c$=1.0.)

At the next hour, at 14:00:00, an upper threshold value, value$_{1,U}$, is calculated based on data from 13:00:01–14:00:00. Now there is historical data for the last hour that has weighted influence on current data. The threshold value for last hour, value$_{h,U}$, is equal to value$_c$. Thus, the value of the upper threshold limit for Metric X at 14:00:00 is:

$$Value_{1,U} = [w_{c,U} * value_{c,U}] + [w_{hU} * value_{h,U}]$$
$$= [0.8 * value_{c,U}] + [0.2 * value_{hU}]$$

The varied weights are based on baseline history, such that there is maximum use of available information. As more history is gathered, weekly data is weighted more heavily and dependence on current information is reduced. Optimal settings are application dependent.

For any time period from the second day following system start-up at onward, the upper threshold value from the previous day (value$_{d,U}$) can be used in the baseline filter, as the following equation shows:

$$Value_{2,U} = [w_{c,U} * value_{c,U}] + [w_{hU} * value_{hU}] + [w_{dU} * value_{dU}]$$
$$= [0.7 * value_{cU}] + [0.1 * value_{hU}] + [0.2 * value_{dU}]$$

The next time the upper threshold value for Wednesday at 14:00:00 is updated is during the next week, on Wednesday, Jul. 14, 2001, at 14:00:00. Since there is now more than a week of historical data, the weighted values from the previous day (Tuesday at 14:00:00) and the previous week (Wednesday, Jul. 4, 2001 at 14:00:00) can be added in. The equation would then be:

$$Value_{3,U} = [w_{cU} * value_{cU}] + [w_{hU} * value_{hU}] + [w_{d,U} * value_{d,U}] +$$
$$[w_{d+n,U} * value_{d+nU}]$$
$$= [0.6 * value_{c,U}] + [0.03 * value_{hU}] + [0.07 * value_{d,U}] +$$
$$[0.3 * value_{d+n,U}]$$

All of the weighted factors ($w_c$, $w_h$, $w_d$, ... ) must add up to 1.0. As time passes, and more history becomes available, the weighted factors will have values that look like those in the following chart. Weighted factors for different applications can be set at different values. After collecting data for N weeks the weighted factors would no longer change.

The following chart illustrates an example of possible weight values for up to 8 weeks

| | |
|---|---|
| Start = | [1.0 * $v_c$] |
| 1 hour = | [0.8 * $v_c$] + [0.2 * $v_h$] |
| 1 day = | [0.7 * $v_c$] + [0.1 * $v_h$] + [0.2 * $v_d$] |
| 1 week = | [0.6 * $v_c$] + [0.1 * $v_h$] + [0.1 * $v_d$] + [$\Sigma w_j$] |
| 2 weeks = | [0.55 * $v_c$] + [0.1 * $v_h$] + [0.1 * $v_d$] + [$\Sigma w_j$] |
| 3 weeks = | [0.50 * $v_c$] + [0.1 * $v_h$] + [0.1 * $v_d$] + [$\Sigma w_j$] |
| 4 weeks = | [0.45 * $v_c$] + [0.1 * $v_h$] + [0.1 * $v_d$] + [$\Sigma w_j$] |
| 5 weeks = | [0.40 * $v_c$] + [0.1 * $v_h$] + [0.1 * $v_d$] + [$\Sigma w_j$] |
| 6 weeks = | [0.35 * $v_c$] + [0.1 * $v_h$] + [0.1 * $v_d$] + [$\Sigma w_j$] |
| 7 weeks = | [0.30 * $v_c$] + [0.1 * $v_h$] + [0.1 * $v_d$] + [$\Sigma w_j$] |
| 8 weeks = | [0.25 * $v_c$] + [0.1 * $v_h$] + [0.1 * $v_d$] + [$\Sigma w_j$] |

Where:

$$\sum_{j=1}^{N}(w_j) = 1.0 - (w_c + w_h + w_d)$$

Figure 5:
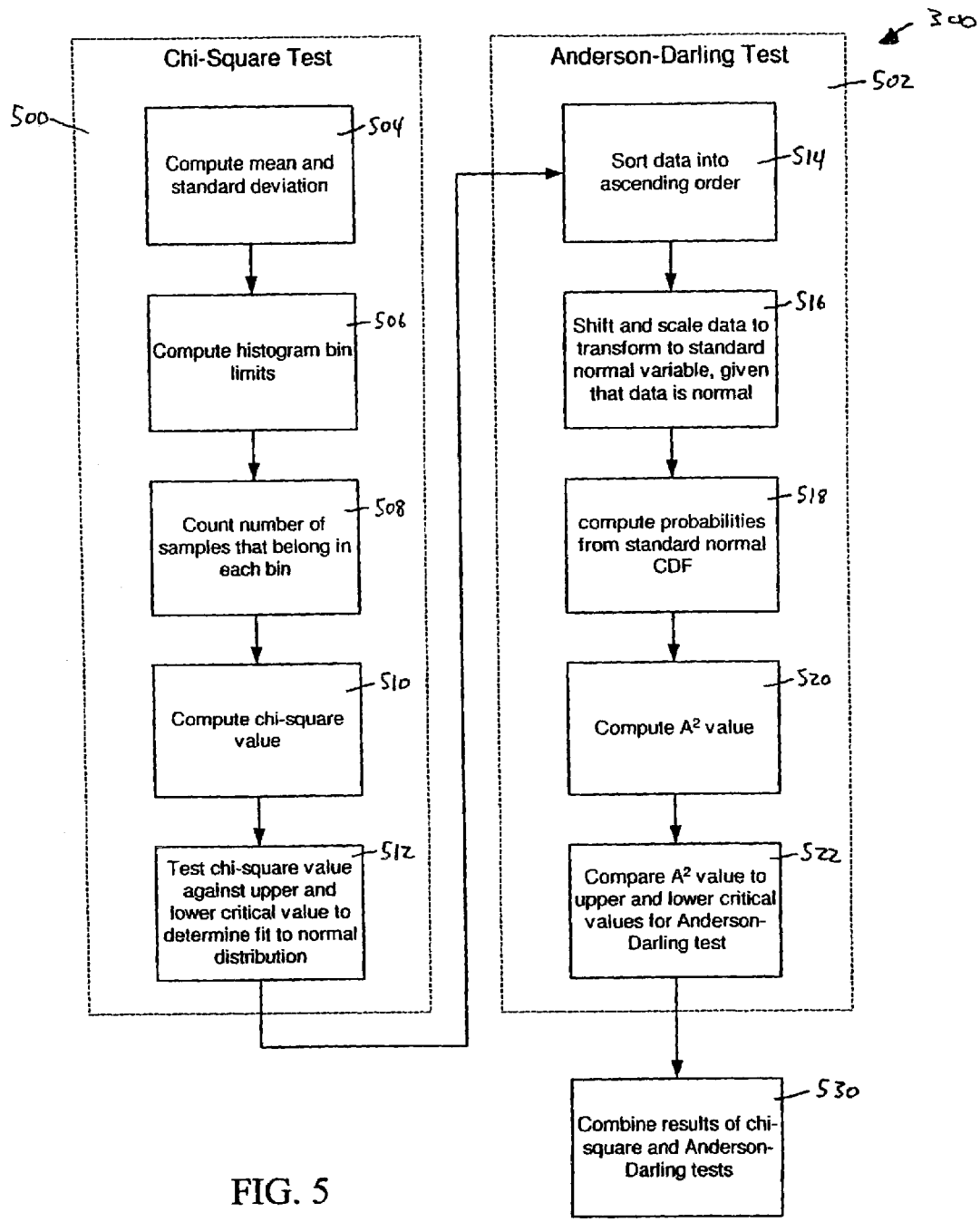
FIG. 5 is a flowchart of a normal test that may be used in accordance with an embodiment of the invention.

Referring now to FIG. 5, a flowchart of a method used by one embodiment to perform the normal test of step 300 is shown. At a high level, chi-square test 500 is performed, Anderson-Darling test 502 is performed, and the results are combined in step 530.

Figure 6:
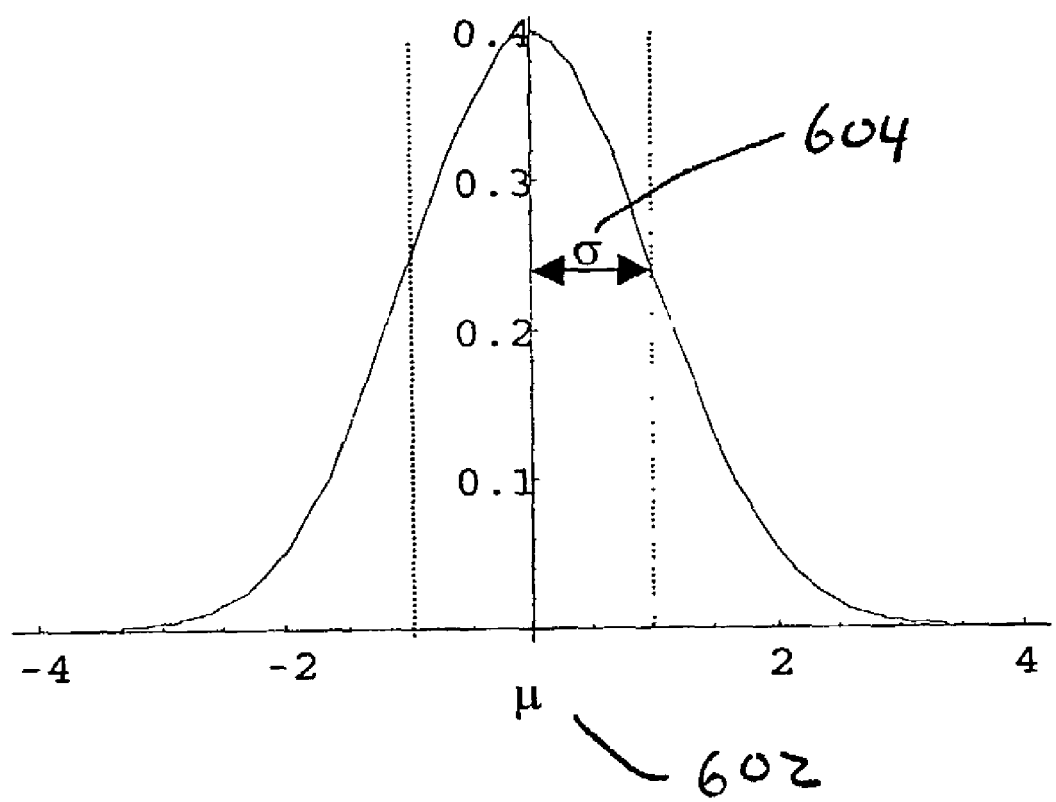
FIG. 6 is an illustrative diagram of a normal distribution, showing the mean and standard deviation in accordance with an embodiment of the invention.

In step 504, the first step of performing the chi-square test, the mean [μ] and standard deviation [σ] of the data are calculated using known statistical methods. The mean and standard deviation are used to determine the shape of a theoretical "bell curve" of the histogram of the data, assuming that the distribution of the data is normal. FIG. 6 shows a sample histogram of normally distributed data, including mean 602 and standard deviation 604.

Referring again to FIG. 5, in step 506, histogram bin limits are computed such that the expected value of the number samples in each bin is constant, given that the distribution is normal. To compute the bin limits, first a set of bins is created for the histogram. The number of bins depends on the number of samples. The rules for deciding the number of bins are:

The number of bins=10% of the number samples.
If the number of samples<30, chi-square test will return not normal.
If the number of bins<6, then the number of bins=6.
If the number of bins>30, then the number of bins=30.

For example, when these rules are applied when the number of samples is 3600, the number of bins will be 30, since 10% of 3600 is 360, which is greater than 30. Similarly, if the number of samples is 90, the number of bins will be 9 (10% of the number of samples). If the number of samples is 40, there will be 6 bins (10% of 40 is less than 6, so 6 bins will be used). If the number of samples is 25, the chi-square test will return a result indicating that the data are not normal.

An expected number of samples for each bin is computed by dividing the number of samples by the number of bins:

$$E = \frac{N}{k} \quad \text{(Eq. 19)}$$

Where:
E=expected value of the number samples per bin, given that the distribution is normal
N=total number of samples
k=total number of bins The upper limits of the bins are computed using $Q_N$, the quantile function of the normal distribution, with mean μ and standard deviation σ. The quantile function is the inverse of the cumulative distribution function (CDF). Thus, given that i/k is the portion of samples that should be in or below bin i, the upper bin limit (UBL) for bin i is computed according the following formula:

$$CDF(UBL_i) = i/k \quad UBL_i = Q_N(i/k) \quad \text{(Eq. 20)}$$

Where:
CDF=Cumulative Distribution Function
UBL=Upper Bin Limit i=bin number
k=total number of bins For example, for 30 bins (i.e., k=30), the following upper bin limits will be computed:

| | | |
|---|---|---|
| $CDF(UBL_1) = 1/30$ | $UBL_1 = Q_N(1/30)$ | $= \mu - 1.83\sigma$ |
| $CDF(UBL_2) = 2/30$ | $UBL_2 = Q_N(2/30)$ | $= \mu - 1.51\sigma$ |
| $CDF(UBL_3) = 3/30$ | $UBL_3 = Q_N(3/30)$ | |
| ⋮ | ⋮ | ⋮ |
| $CDF(UBL_{29}) = 29/30$ | $UBL_{29} = Q_N(29/30)$ | $= \mu + 1.83\sigma$ |
| | $UBL_{30}$ = max sample + 1 | |

Next, in step 508, the number of samples that belong in each bin are counted. This may be accomplished by sorting the samples into ascending order, and then segmenting the samples into the bin so that each bin gets all those samples that have values greater than the UBL of the previous bin, and less than or equal to the UBL for the current bin. The count, $C_i$ of the samples in bin i is used to compute the chi-square value. In one embodiment, after the samples have been sorted in ascending order, the counts $C_i$ for each bin can be computed using the method described in the following pseudocode:

Set bin number i=1.
For all samples j=1 to N
   While sample$_j$>UBL$_i$
     Increment i to point to next bin
   Increment counter $C_i$ of bin i Next, in step 510, the system computes the chi-square value to measure the "goodness of fit" between the histogram and the normal curve. The chi-square value is computed using the following formula:

$$\chi^2 = \sum_{i=1}^{k}(C_i - E)/E \quad \text{(Eq. 21)}$$

Where:
k=the total number of bins
$X^2$=chi-square value
$C_i$=count in bin i
i=bin number
E=expected value of the count computed above In step 512, the system tests the chi-square value against two critical values, the lower critical value and upper critical value, taken from a standard chi-square table, to determine whether the data fit a normal distribution. If the chi-square value is below the lower critical value, then the data is probably normal (no indication of non-normality). If the chi-square value is between the lower critical value and the upper critical value, then the data is possibly normal (weak indication of non normality). If the chi-square value is above the upper critical value, then the data is not likely to be normal (strong indication of non-normality).

Next, at step 514, the system starts performing the Anderson-Darling test. The Anderson-Darling test is a "distance test" based on the probability integral transform, which uses the CDF of the hypothesized distribution to transform the data to a uniformly distributed variant. In step 514, the data is sorted into ascending order. This may have already been performed, during step 508, in which case the data need not be re-sorted.

In step 516, the system uses the mean and standard deviation of the data (that were already computed above) to shift and scale the data to transform the data into a standard normal variable, given that the data itself is normal. This transformation is performed using the following formula:

$$W_i = \frac{x_i - \mu}{\sigma} \tag{Eq. 22}$$

Where:
$W_i$=each transformed sample;
$x_i$=each sample;
$\mu$=mean; and
$\sigma$=standard deviation Next, in step 518, the system computes the corresponding probabilities ($P_i$) from the standard normal CDF ($F_N$). The probabilities are computed according to the following formula:

$$P_i = F_N(W_i) \tag{Eq. 23}$$

In step 520, a statistic called $A^2$ is computed, using the following formula:

$$A^2 = \frac{\sum (2i-1)[\ln(P_i) + \ln(1 - P_{(N+1-i)})]}{N} - N \tag{Eq. 24}$$

Next, in step 522, the $A^2$ value is compared to upper and lower critical values that can be found in a standard table of critical values for the Anderson-Darling test. If the $A^2$ value is below the lower critical value, then the data is probably normal (no indication of non-normality). If the $A^2$ value is between the lower critical value and the upper critical value, then the data is possibly normal (weak indication of non-normality). If the $A^2$ value is above the upper critical value, then the data is not likely to be normal (strong indication of non-normality).

Finally, in step 530, the results of the chi-square test and the Anderson-Darling test are combined to reach a conclusion as to whether the data are normal. The results are combined according to the following table:

TABLE 1

Combination of chi-square and Anderson Darling tests

|  |  | $X^2$ |  |  |
| --- | --- | --- | --- | --- |
|  |  | — | W | S |
| A–D | — | N | N | X |
|  | W | N | X | X |
|  | S | X | X | X |

Where:
A–D is the row of results of the Anderson-Darling test;
$X^2$ is the column of results of the chi-square test;
— = a result (from either test) of no indication of non-normality;
W = a result of a weak indication of non-normality;
S = a result of a strong indication of non-normality;
N = the overall conclusion is that the data are normal; and
X = the overall conclusion is that the data are non-normal.

As can be seen in Table 1, if either the chi-square or the Anderson-Darling tests (or both) indicate that there is no indication of non-normality, and neither test indicates that there is a strong indication of non-normality, then the normal test will conclude that the data fit a normal distribution. Otherwise, the normal test will conclude that the data do not fit a normal distribution.

Figure 7:
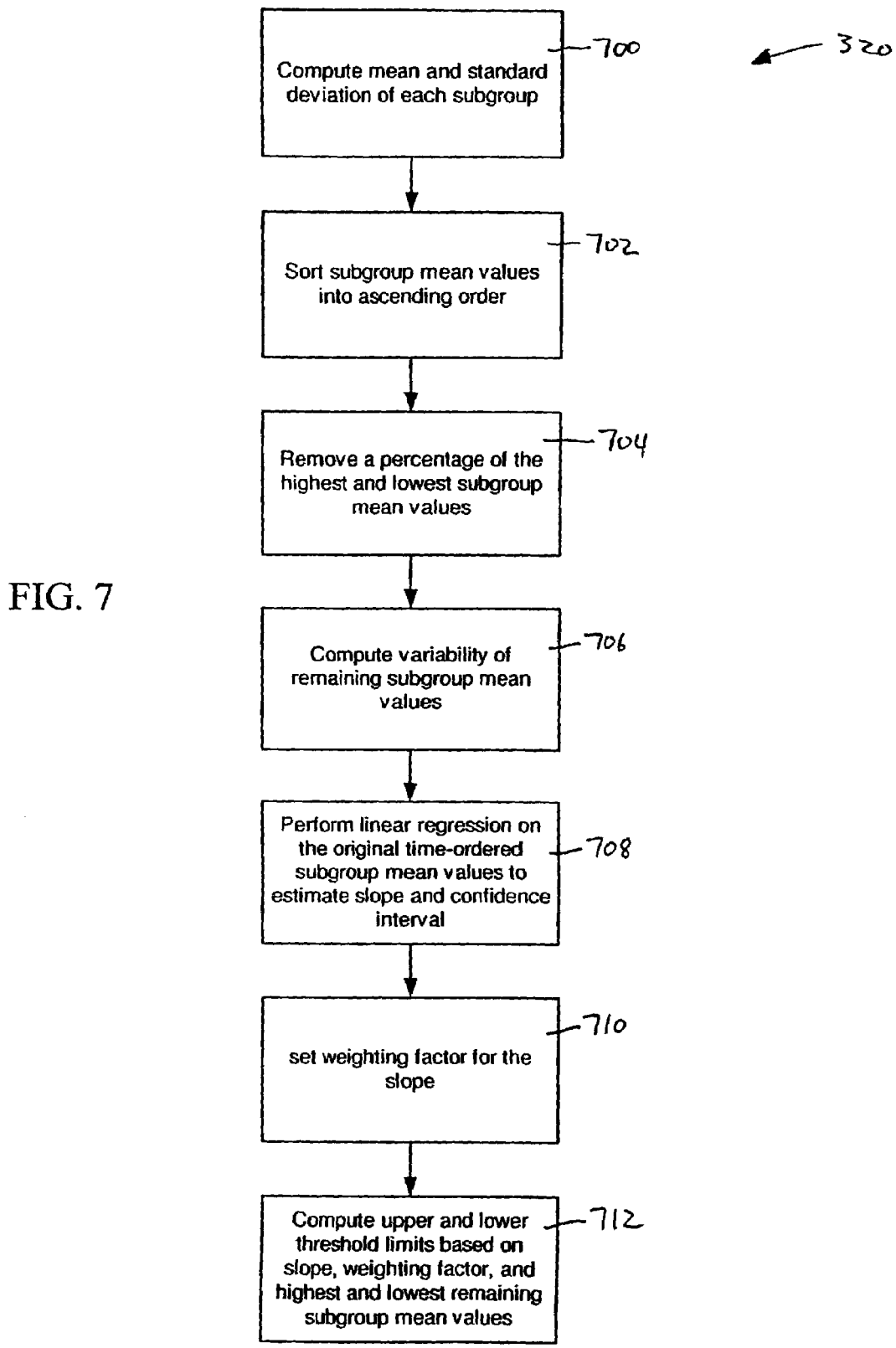
FIG. 7 is a flowchart if a heuristic threshold limit calculation method in accordance with an embodiment of the invention.

Referring now to FIG. 7, the heuristic limit calculation of step 320 is described. The heuristic limit calculation is used when the data is not normal, and is not normalizable. The heuristic limit calculation component computes thresholds based on the quantile function of the subgroup means, augmented with a linear regression-based estimate of the rate of change of the metric.

At step 700, the heuristic limit calculation computes a mean and standard deviation for each subgroup. This is done by applying the formulas:

$$\mu_j = 1/k \Sigma x_i \tag{Eq. 25}$$

$$\sigma_j = \sqrt{[\Sigma(x_i - \mu_j)^2]/(k-1)} \tag{Eq. 26}$$

Where:
$\mu_j$ is the mean for subgroup j;
$\sigma_j$ is the standard deviation for the subgroup;
k is the number of data elements in the subgroup; and
$x_i$ are the data elements in the subgroup.

Figure 8:
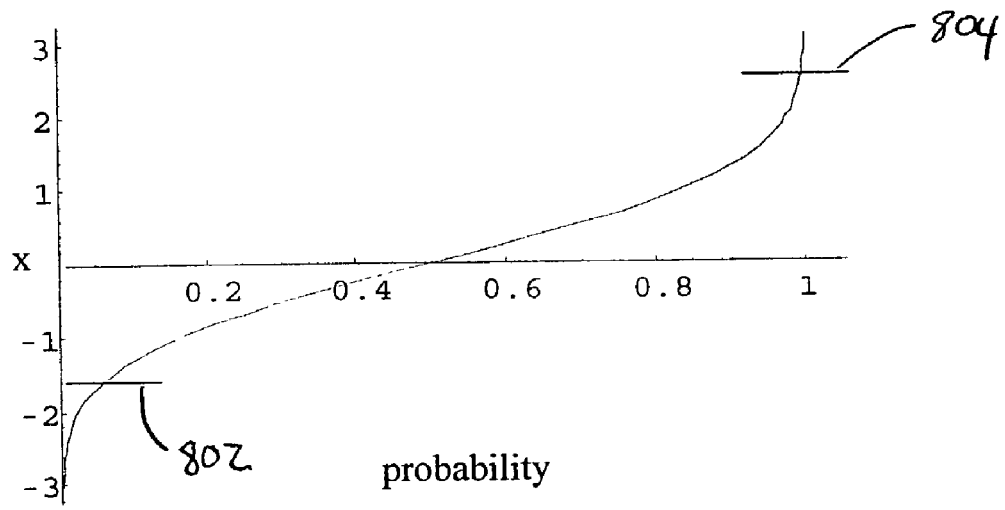
FIG. 8 is an illustrative diagram of the quantile function of the means of subgroups of metric data in accordance with an embodiment of the invention.

Next, in step 702, the $\mu j$ are sorted into ascending order, forming the quantile function of the means. FIG. 8 shows an example of a quantile function of the means, with minimum value 802, and maximum value 804.

Referring again to FIG. 7, in step 704, a percentage of the highest and lowest means are removed, based on the number of upper and lower alarms, respectively. Generally, this serves to decrease the portion of eliminated readings as the number of alarms increases. In one embodiment, this is achieved by applying the following elimination equation:

$$E = out \times \left( p \times \frac{B}{(B + out)} + q \right) \tag{Eq. 27}$$

Where:
out is the number of values out of limit;
B is a breakpoint setting that determines how quickly the curve flattens per number of samples;
q is the percentage to remove for a large number of out of limit values;
p is 1−q, so that p+q=1; and
E is the number of values to remove.

Figure 9:
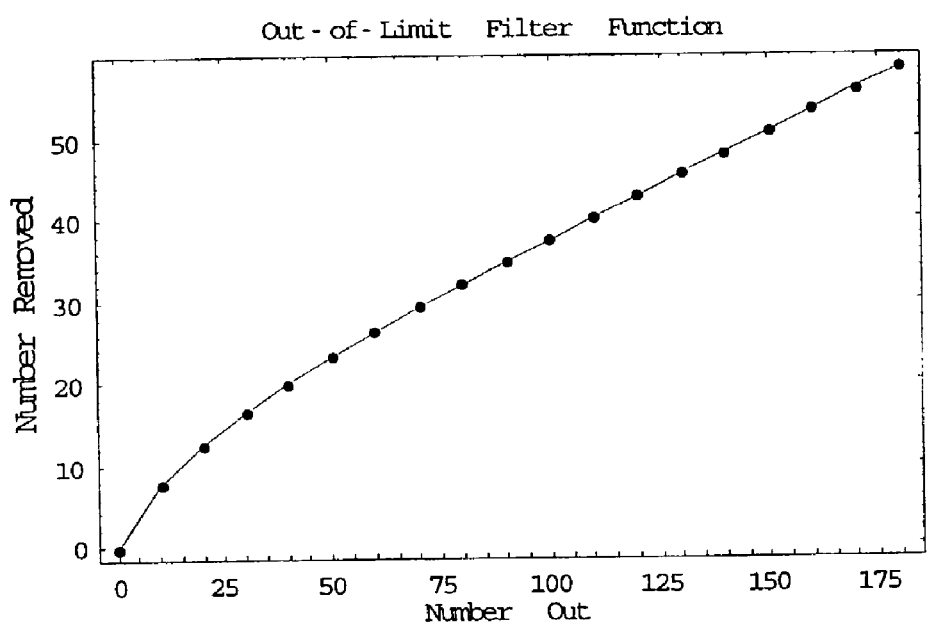
FIG. 9 is an example plot of a function in accordance with an embodiment of the invention to eliminate a percentage of the highest and lowest subgroup mean values.

FIG. 9 shows an example plot of the function of Eq. 27 for B=20, q=0.25.

Referring again to FIG. 7, in step 706, the variability of the remaining subgroup means ($\sigma$) is computed. This may be achieved using the following formula:

$$\sigma = \frac{1}{(M-E)} \times \sum_{A}^{B} \sigma_j \tag{Eq. 28}$$

Where:
A is the lowest remaining subgroup mean value;
B is the highest remaining subgroup mean value;
M is the number of subgroups;
E is the number of subgroup mean values that were removed; and
$\sigma_j$ is the standard deviation for the subgroup.

Figure 10:
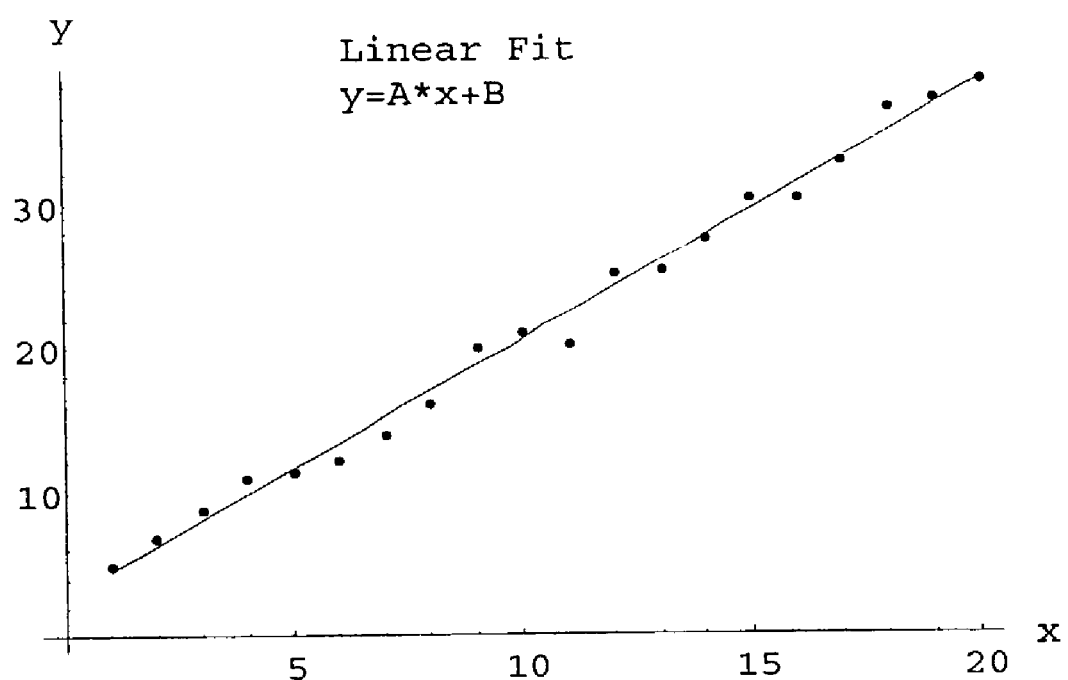
FIG. 10 is a graph showing an example of linear regression.

Next, in step 708, known statistical techniques are used to perform linear regression on the original time-ordered $\mu_j$ to estimate a slope (b) and a confidence interval (c). An illustration of linear regression on the subgroup means is shown in FIG. 10.

Referring again to FIG. 7, in step 710, the heuristic limit calculation sets a weighting factor for the slope that resulted from the linear regression of step 708. This weighting factor is inversely proportional to the confidence interval, representing the notion that the larger the confidence interval, the less the computed slope of the linear regression should be trusted. In one embodiment, the weighting factor for the slope may be computed using the following formula:

$$k_b = b/(b + R \times c) \quad \text{(Eq. 29)}$$

Where:
$k_b$ is the weighting factor for the slope;
b is the slope;
c is the confidence interval; and
R is a confidence interval scale factor (typically 10).

Finally, in step 712, the upper and lower threshold limits are computed, using the following formula:

$$UTL = \max + k_s * \sigma + k_b * b * \Delta t \quad \text{(Eq. 30)}$$

$$LTL = \min - k_s * \sigma + k_b * b * \Delta t \quad \text{(Eq. 31)}$$

Where:
UTL is the Upper Threshold Limit;
LTL is the Lower Threshold Limit;
$k_s$ is the percent of standard deviation to apply (nominally 0.75);
$k_b$ is the slope weighting factor computed above;
max is the highest remaining mean (B);
min is the lowest remaining mean (A); and
$\Delta t$ is the amount of time between threshold computations (user specified, typically 1 hour)

Figure 11:
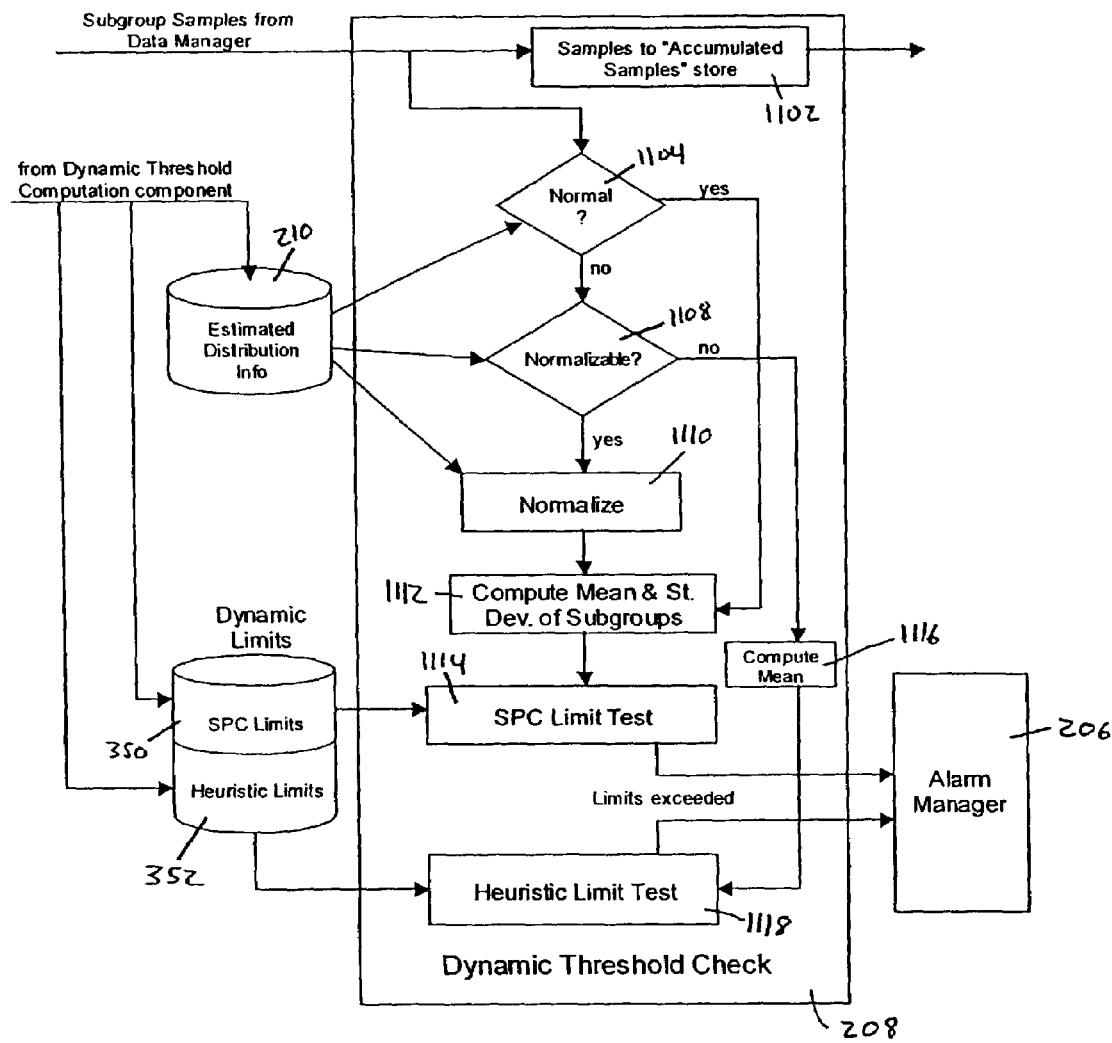
FIG. 11 is a flowchart of a dynamic threshold check method in accordance with an embodiment of the invention.

Referring now to FIG. 11, a flowchart of dynamic threshold check module 208 is described. Data manager 200 sends subgroup samples, which typically include samples of a metric that are consecutive, and spaced closely in time, to dynamic threshold check module 208. In step 1102, dynamic threshold check module 208 copies the samples to accumulated samples store 214, for later use in dynamic threshold computation.

Next, in step 1104, dynamic threshold check module 208 determines whether the distribution for the metric that is being checked is normal. This is typically done by looking up a flag that indicates whether the distribution for the metric is normal from distribution information store 210.

If the distribution for the metric is not normal, in step 1108, dynamic threshold module 208 determines whether the distribution for the metric is normalizable. This is typically done by retrieving a flag indicating whether the distribution for the metric is normalizable from distribution information store 210. Generally, the estimated distribution for a metric is normalizable if dynamic threshold computation module 216 determined that it fit one of several standard distribution (e.g., a gamma distribution, a beta distribution, a Weibull distribution, etc.).

If the estimated distribution for the metric is normalizable, then in step 1110 the dynamic threshold check module 208 will normalize the sample data in the subgroup. This is done using methods similar to those discussed above in step 318, by, for example, (1) passing data through the function representing its estimated cumulative distribution, and then (2) passing that result through the quantile function of a normal distribution.

In step 1112, the mean and standard deviation of the subgroup data are computed.

Figure 12:
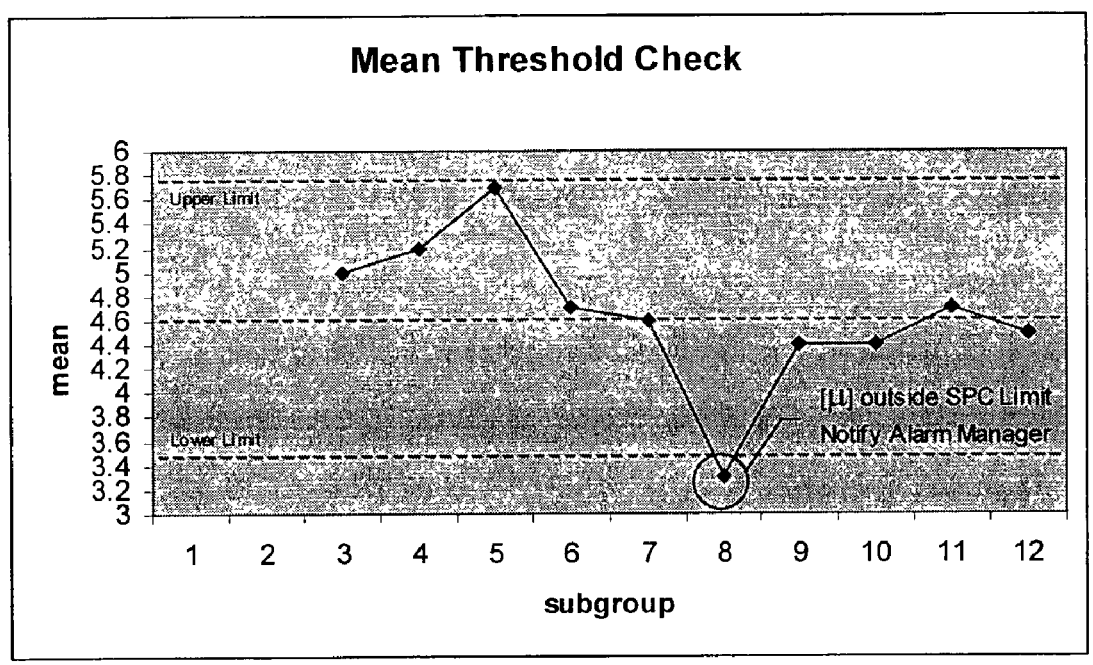
FIG. 12 shows an example of a threshold check being applied to a set of subgroup mean values in accordance with an embodiment of the invention.

Step 1114 performs an SPC limit test on the data to determine whether there is a threshold violation. The SPC limit test is performed by obtaining the SPC limits from SPC limits store 350. The mean and standard deviation are compared to the upper and lower limits for the mean and standard deviation for each subgroup. If the mean or standard deviation of any of the subgroups falls outside of the limits, then notification of a threshold violation is sent to alarm manager 206. FIG. 12 shows an example, in which the means for ten subgroups are compared to upper and lower SPC limits for the mean. As can be seen, one of the subgroup means falls outside of the limits.

Referring again to FIG. 11, in step 1116, if the estimated distribution for a subgroup is not normal, and is not normalizable, then dynamic threshold check module 208 computes the statistical mean of the data in the subgroup, and performs a heuristic limit test, in step 1118. The heuristic limit test of step 1118 checks the mean against upper and lower mean threshold limits that were calculated by dynamic threshold computation module 216, and were stored in heuristic limits store 352. If the mean is outside of the upper and lower limits, notification of a violated threshold is sent to alarm manager 206.

Figure 13:
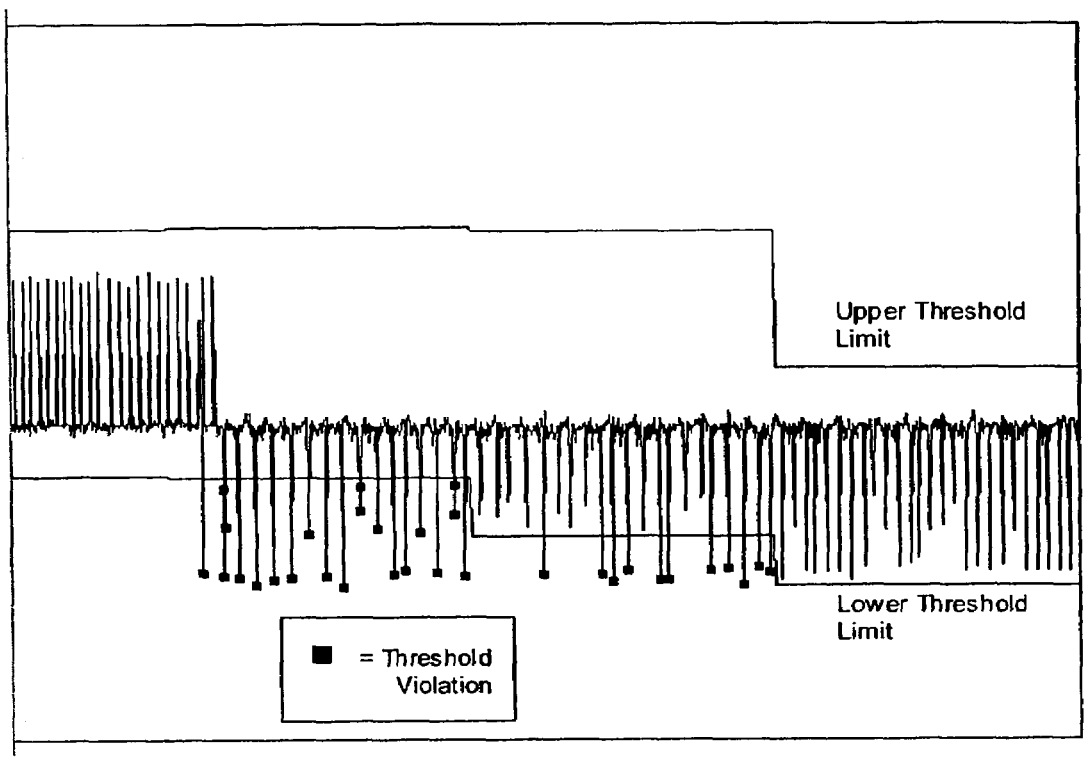
FIG. 13 shows an example of dynamic threshold adjustment, in accordance with an embodiment of the invention.

Overall, use of an adaptive threshold process, as described hereinabove, permits computation of a baseline of the statistics of the data of a metric to uncover daily, weekly, monthly, yearly, or any combination thereof, cyclic patterns. A beneficial, technical effect of this feature is that the patterns in the metrics are revealed or emphasized when they might have been obscured by, for example, the volume of data collected. A large number of metrics and increased system complexity also contribute to the problem of detecting the patterns—a problem that this feature solves. These patterns are used to filter the statistics used to compute thresholds such that they can use history to predict the next threshold setting, thereby reducing false alarms. In addition short-term future expected behavior is predicted, and used to adjust the thresholds, further reducing false alarms. As shown in an example of FIG. 13, generally, the ability to dynamically adjust thresholds permits the system to adjust to shifts in the activity of a system, and to distinguish between short bursts of alarms, and longer term shifts in a metric baseline.

Adaptive Metric Grouping

Figure 14:
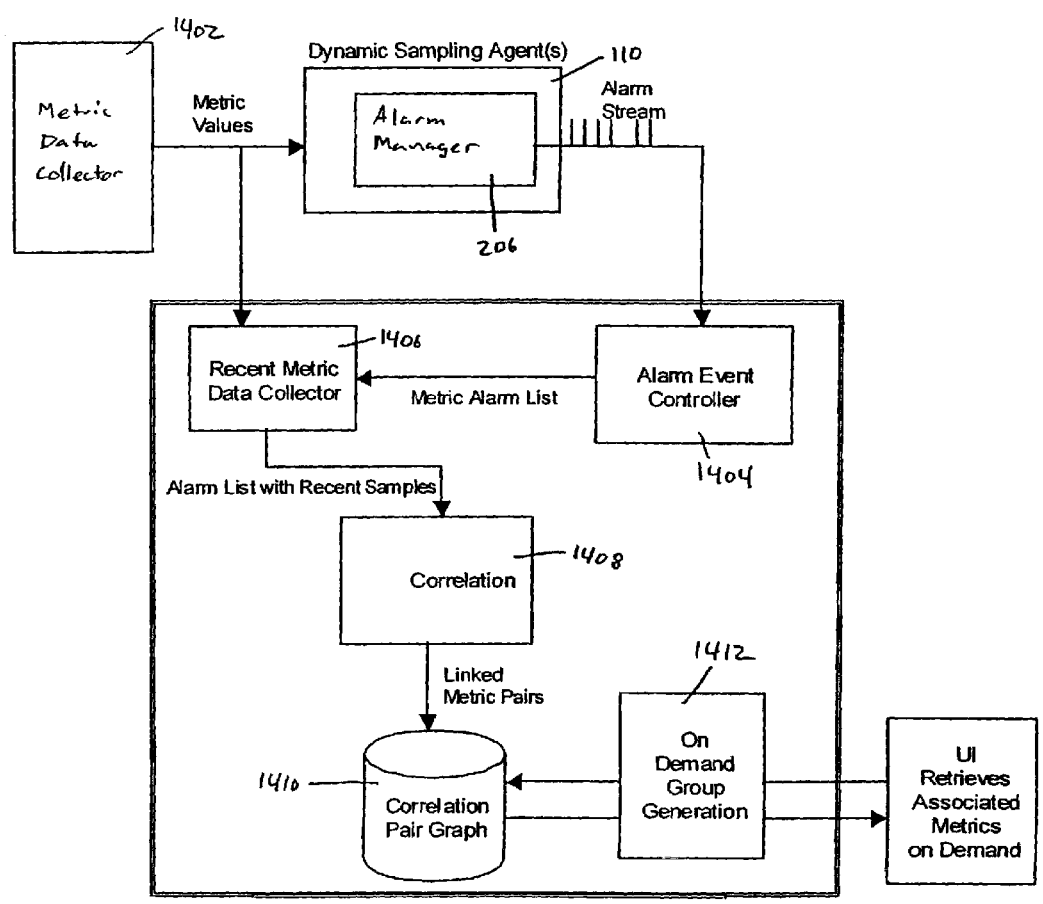
FIG. 14 shows a process for dynamic metric correlation and grouping in accordance with an embodiment of the invention.

Referring now to FIG. 14, a process for metric correlation in accordance with the present invention is described. A beneficial, technical effect of this feature is that relationships between the metrics are revealed or emphasized when they might have been obscured by, for example, the volume of data collected. A large number of metrics and increased system complexity also contribute to the problem of detecting the relationships—a problem that this feature solves. As noted hereinabove, this metric correlation is used in metric correlation component 116 of metric analysis module 104.

Generally, metric sample values are monitored by dynamic sampling agent 110 or a network of computers monitored by dynamic sampling agents 110 within a system. As discussed in detail hereinabove, dynamic sampling agent(s) 110 provide threshold alarms based on dynamic, statistical threshold generation. Generally, dynamic sampling agent(s) 110 monitor all metrics for threshold violations. If a metric causes a threshold violation, alarm manager 206 within dynamic sampling agent(s) 110 sends out an alarm, indicating an out-of-tolerance metric. Additionally, dynamic sampling agent(s) 110 provides metric data to recent metric data collector 1406, where the information is stored for a predetermined time, for example, fifteen minutes.

Threshold alarm events (i.e., notification of out-of-tolerance metrics) are received by alarm event controller 1404. Alarm event controller 1404 collects: 1) the metric name that caused the threshold alarm and, 2) the time the threshold alarm occurred. Alarm event controller 1404 continuously collects alarms generated by dynamic sampling agent(s) 110. Action is taken when there are a particular number of alarm groups within a predetermined time period, (i.e., when a predetermined frequency of alarms is reached). This alarm group frequency parameter is configurable. For example, the alarm group parameter can be configured to cause alarm event controller 1404 to trigger further action if it receives ten alarms within thirty seconds. When the alarm frequency specified in the alarm frequency parameter is reached, alarm event controller 1404 is activated, and sends a list of these out-of-tolerance metrics to recent metric data collector 1406. The set of out-of-tolerance metrics in the list that is sent to recent metric data collector 1406 is referred to as an "alarm group."

Alarm event controller 1404 only counts the threshold alarms at the time the threshold is crossed, and does not count an alarm repeatedly if the alarm remains active over a period of time. An alarm will generally only be counted twice if it is triggered, reset, and then triggered again. In cases where there are alarms that are repeatedly triggered in this manner, one embodiment of alarm event controller 1404 will count all such triggers, but report only the most recent one to data collector 1406.

For example, suppose that twenty-six metrics are monitored, having ID's A–Z. Alarm event controller 1404 receives occasional alarms on these metrics. Suppose that alarm event controller 1404 receives the following alarms:

| Time | Metric |
|---|---|
| 09:45:21 | C, D, F, M |
| 09:45:22 | A |
| 09:45:23 | |
| 09:45:24 | |
| 09:45:25 | |
| 09:45:26 | P, R, W |
| 09:45:27 | H |
| 09:45:28 | G |
| 09:45:29 | C |
| 09:45:30 | P |

At time t=09:45:30 alarm event controller 1404 is activated because the #alarms/Δt (in this example, ten alarms within thirty seconds) parameter is reached, since there have been a total of twelve alarms within the timeframe 09:45:21–09:45:30.

As noted above, alarm event controller 1404 only counts the threshold alarms at the time the threshold is crossed, not each second of threshold violation. For example, the alarm for metric D could be active for five minutes from when it was tripped at 09:45:21, but the alarm is recorded by the Alarm Event Controller only once at the time it was activated at 09:45:21. The metric alarm is counted again only if it is reset and tripped again, such as metrics C and P. Metric C was tripped at 09:45:21 and reset some time within the next seven seconds and tripped again at 09:45:29. Metric P was tripped at 09:45:26 and then reset some time within the next three seconds and tripped again at 09:45:30.

In the example, the list of metrics that activated the alarm event controller is:

C D F M A P R W H G C P

Since (the underlined) metrics C and P appear twice, alarm event controller 1404 dismisses the first metric C and metric P in the Metrics List and retains the most recent ones. Thus, alarm event controller 1404 sends the following metric name list (alarm group) to recent metric data collector 1406:

D F M A R W H G C P

Recent metric data collector 1406 collects historic metric data from metric data collector 1402 for metrics that are in the alarm group provided by alarm event controller 1404. This historic metric data is collected over a predetermined period of time (e.g., ten minutes), and is sent to correlation module 1408. The historic data for the metrics is synchronized, so that collection of the data starts from the activation time of alarm event controller 1404 (e.g., 09:45:30 in the example) and goes back in time for a predetermined period at predetermined intervals. For example, if the system was configured to look at historical data for the previous ten minutes, at one second intervals, there would be 600 samples for each alarmed metric.

Sometimes there are gaps in the data collected by recent metric data collector 1406 where metric samples were not recorded. In one embodiment, recent data collector 1406 includes an align and filter process (not shown) that aligns data in the correct timeslots and filters out entire timeslots containing incomplete data. An example of such a process, using the metrics of the previous example, is shown in FIG. 15. As can be seen, in timeslot 1502, for time 09:45:30, data for metric P is missing. In timeslot 1504, for time 09:45:28, data for metric D is missing. In timeslot 1506, for time 09:45:25, data for metrics D, R and P are missing. Since complete datasets for each timeslot are desirable to obtain the best correlation results, the entire datasets for timeslots 1502, 1504, and 1506 will be deleted before the samples are sent to correlation module 1408.

In an alternative embodiment, instead of deleting the entire dataset, "pairwise deletion" may be used. Using pairwise deletion, only data for certain pairs of metrics within a given time slot are deleted. Typically, such pairwise deletion occurs during the correlation process (i.e., within correlation module 1408), when data for one of the metrics to be correlated is missing. Data for the other metric in the pair is deleted, and the correlation for that pair uses only samples from the time slots that have data for both metrics. While more data is retained using this technique, because the correlation is performed on incomplete datasets, a higher correlation coefficient is required to signify statistically significant correlation.

Referring again to FIG. 14, correlation module 1408 receives historical data from recent metric data collector 1406. Continuing the previous example, correlation module 1408 would receive 600 samples of data for each metric (i.e., ten minutes of historical data, at one sample per second for each metric), minus any incomplete timeslots. Thus, for metrics D and F, the following data are received:

| Metric D | Time (t) | Metric Value |
|---|---|---|
| | 09:45:30 | $V_{D-1}$ → Removed |
| | 09:45:29 | $V_{D-2}$ |
| | 09:45:28 | $V_{D-3}$ → Removed |

-continued

|  | : | : |
|---|---|---|
|  | : | : |
|  | : | : |
|  | 09:35:31 | $V_{D\text{-}600}$ |
| Metric F | Time (t) | Metric Value |
|  | 09:45:30 | $V_{F\text{-}1}$ → Removed |
|  | 09:45:29 | $V_{F\text{-}2}$ |
|  | 09:45:28 | $V_{F\text{-}3}$ → Removed |
|  | : | : |
|  | : | : |
|  | : | : |
|  | 09:35:31 | $V_{F\text{-}600}$ |

The equivalent data for metrics M, A, R, W, H, G, C, and P is also received by correlation module 1408.

Next, correlation module 1408 creates a list of all metric pairs in this alarm group. The number of pairs follows the formula:

$$\frac{N*(N-1)}{2} \quad \text{(Eq. 32)}$$

Where N is the number of metrics in the alarm group.

In our example, N=10, so applying this formula yields (10*9)/2=45 pairs of metrics to be correlated. If all metric pairs in the example system had to be correlated, instead of having 45 pairs, there would be (26*25)/2=325 pairs to be correlated. By correlating only the metrics in an alarm group, a system according to the invention makes metric grouping possible for systems with thousands of metrics.

Next, correlation module 1408 correlates the metric values for each pair. For example, for the pair D and F, the following values would be correlated (note that the datasets at t=09:45:30 and t=09:45:28 are missing, because they are incomplete):

| Time (t) | Metric D, Metric F |
|---|---|
| 09:45:29 | $(V_{D\text{-}2}, V_{F\text{-}2})$ |
| 09:45:27 | $(V_{D\text{-}4}, V_{F\text{-}4})$ |
| . | . |
| . | . |
| . | . |
| 09:35:31 | $(V_{D\text{-}600}, V_{F\text{-}600})$ |

In one embodiment of the invention, instead of using conventional linear correlation, correlation module 1408 uses nonparametric, or rank correlation to correlate pairs of metrics in an alarm group. Generally, in rank correlation, the value of a particular data element is replaced by the value of its rank among other data elements in the sample (i.e., 1, 2, 3, . . . , N). The resulting lists of numbers will be drawn from a uniform distribution of the integers between 1 and N (assuming N samples). Advantageously in rank correlation, outliers have little effect on the correlation test and many non-linear relationships can be detected. In one embodiment, Spearman rank-order correlation is used to correlate the metric values for each pair of metrics.

A pair is considered correlated by correlation module 1408 if a significant value for the correlation coefficient is reached. Significance is determined using known statistical techniques, such as the "Students' t test" technique, with t computed as follows:

$$t = r_s \sqrt{\frac{(N-2)}{(1-r_s^2)}} \quad \text{(Eq. 33)}$$

Where

N is the number of samples; and $r_s$ is a correlation coefficient.

For a number of samples (N) of 600, a correlation coefficient ($r_s$) of 0.08, t would equal 1.96, which is a 95% confidence indicator. So, 0.1 is a reasonable minimum threshold for the correlation coefficient in our example.

Sometimes when one metric affects another metric, the effect is delayed, causing the pair of metrics not to correlate due to the delay. To detect this, the first list in the metric pair is shifted one second in relation to the second list and re-correlated to see if the result is better. In one embodiment, this process is repeated 5 times for +Δt and 5 times for −Δt. This permits delayed correlations to be detected within a predetermined period. For example, the following shows metric D values shifted by a Δt of +2 relative to the values of metric F:

| Time (t) | Metric D, Metric F |
|---|---|
| 09:45:29 | $(\quad, V_{F\text{-}2})$ |
| 09:45:27 | $(V_{D\text{-}1}, V_{F\text{-}3})$ |
| . | . |
| . | . |
| . | . |
| 09:35:31 | $(V_{D\text{-}598}, V_{F\text{-}600})$ |
|  | $(V_{D\text{-}599}, \quad)$ |
|  | $(V_{D\text{-}600}, \quad)$ |

$V_{F\text{-}2}$, $V_{D\text{-}599}$, and $V_{D\text{-}600}$ are not used in this correlation because the time shift leaves them unpaired.

Figure 16A:
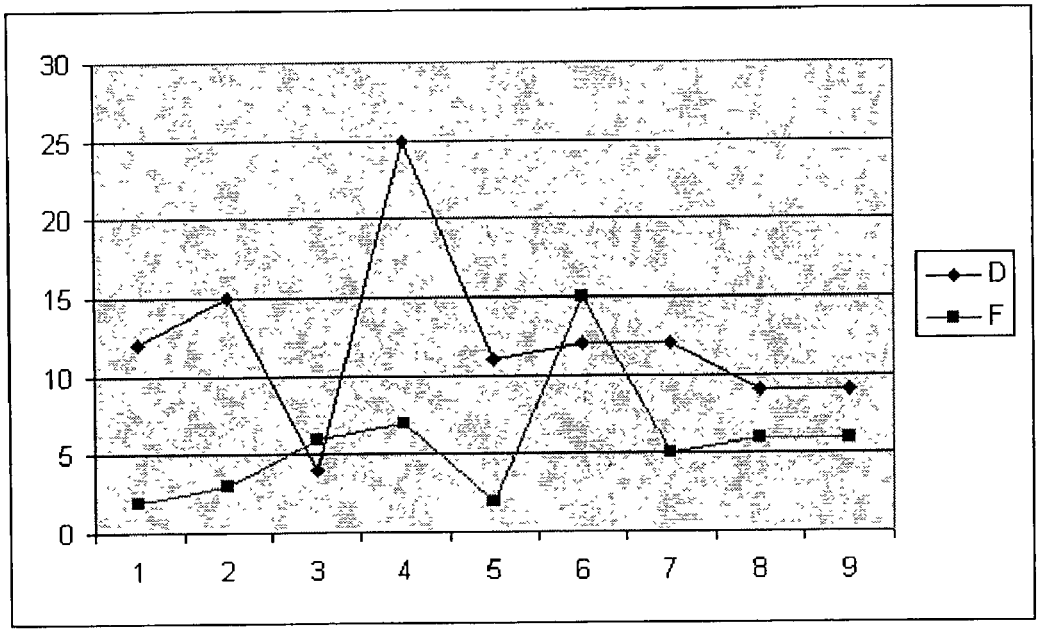
FIGS. 16A and 16B are example graphs demonstrating the use of time shifting of data to identify correlations between metrics, in accordance with an embodiment of the invention.
Figure 16B:
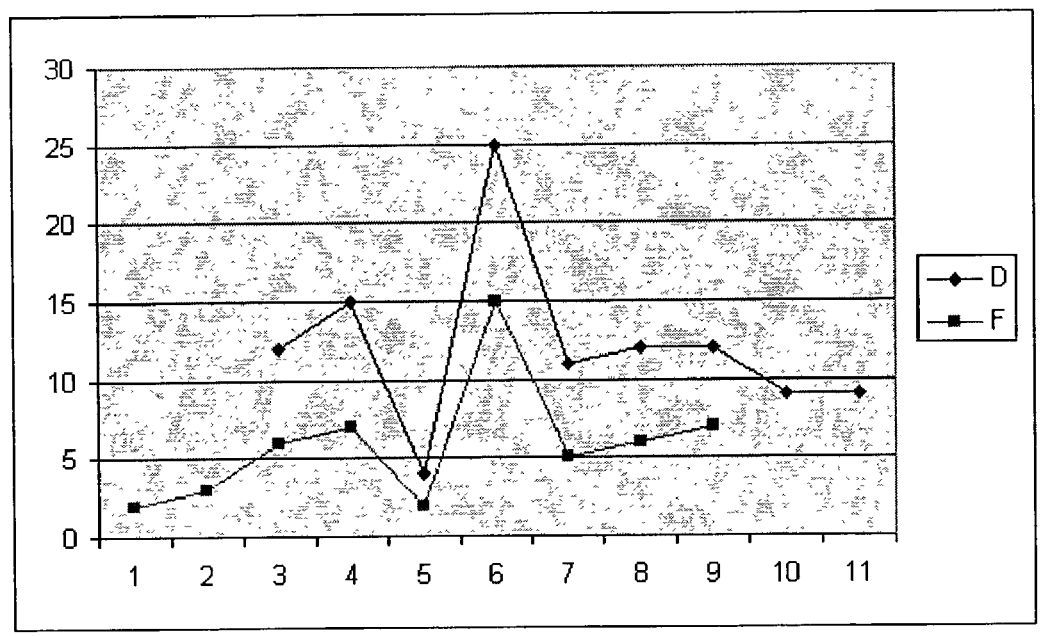

The benefit of this time shifting can be seen in FIGS. 16A and 16B. In FIG. 16A, metrics D and F are not shifted in time relative to each other, and there does not appear to be a correlation between the values of metric D and the values of metric F. In FIG. 16B, metric D is shifted forward by two seconds, and the correlation between the values of metric D and the values of metric F becomes apparent.

Referring again to FIG. 14, Next, the correlated metric pairs are stored as a correlation pair graph, in correlation pair graph module 1410.

Correlated pair graph module 1410 handles all correlated metrics as nodes in a graph with the edges, or links in the graph indicating a correlation link between a pair of nodes. Whenever correlated pairs of metrics enter correlated pair graph module 1410 from correlation module 1408, the graph is updated. Correlation connecting links are added, the correlation coefficients on existing links are updated, or links are deleted if not reinforced. For example, if a particular pair of correlated metrics has not been entered for a preset time, such as a month, the correlation link between the pair in the correlation pair graph may be deleted.

Figure 17:
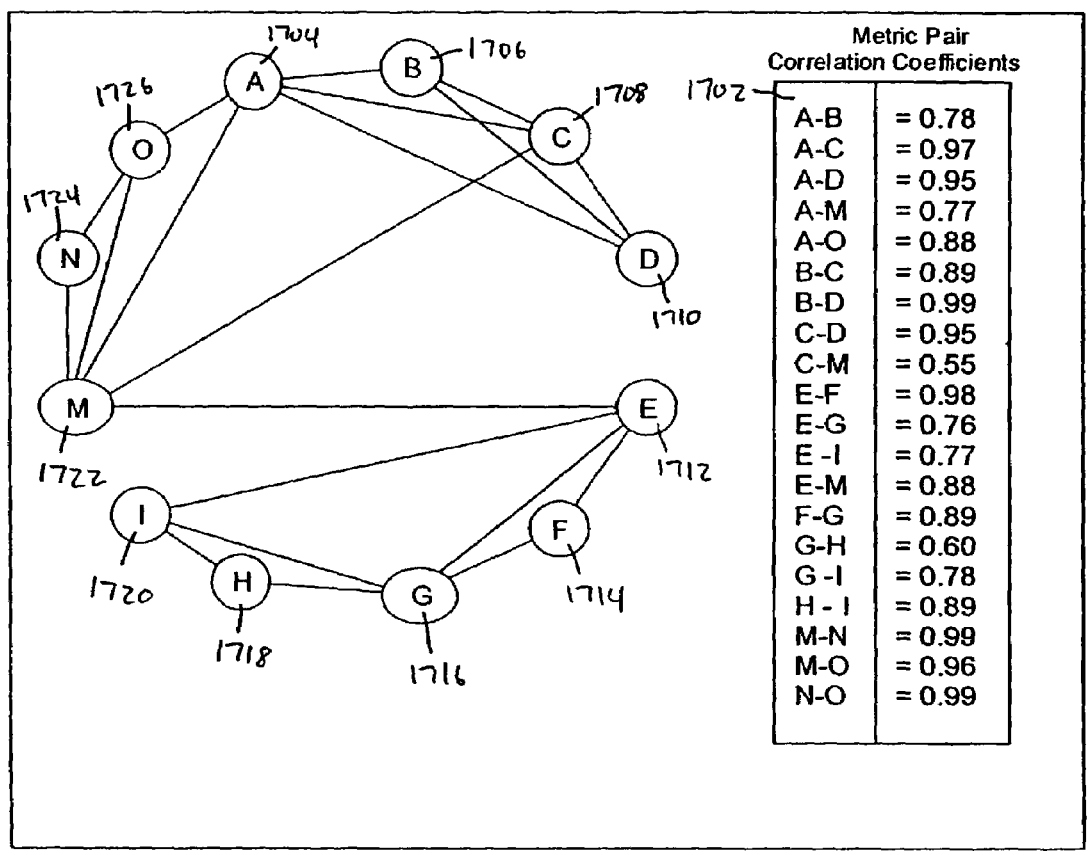
FIG. 17 shows an example correlation pair graph, in accordance with an embodiment of the invention.

FIG. 17 shows an example of a correlation pair graph, and includes (for illustrative purposes) table 1702 of correlated metric pairs and their correlation coefficients derived from using Spearman's Rank Correlation. Each node in the graph (e.g., such as nodes 1704, 1706, or 1708) represents an alarm metric. Each edge, or link connecting two nodes represents a correlation link having a correlation coefficient greater than a predetermined threshold. A system according to the invention stores all correlation links between alarm metrics in such a correlation pair graph.

For the example in FIG. 17, it can be seen that metric A (node 1704) is strongly correlated to metrics B (node 1706), C (node 1708), and D (node 1710). Metric A (node 1704) is also correlated to metrics O (node 1726) and M (node 1722). In this graph, all of metric A's correlation relationships are maintained. This is an advantage to this technique.

As noted above, the correlation pair graph may be updated as further correlation data for the metric pairs is added. For example, the correlation coefficient for the A-M link in the graph of FIG. 17 could be updated from 0.77 to 0.89. If no A-M pairs are entered for longer than a predetermined time, such as one month, the A-M pair can be removed, causing the link between node 1704 and node 1722 to be removed in the correlation pair graph in FIG. 17.

The correlation pair graphs in accordance with the invention are dynamic, changing as additional correlation data is added, updated, or deleted. For example, if correlation data indicating a correlation between a pair is entered, or there is other evidence of correlation, the correlation coefficient for that pair may be updated or increased to represent a strengthened correlation. This can be done, for example, by computing a weighted sum of the old correlation coefficient and the new correlation coefficient. Similarly, if no correlations for a pair are entered over a predetermined time, or there is a lack of supporting evidence for a pair being correlated, or both, the correlation coefficient for the pair may be decreased. This may be achieved by causing the correlation coefficient for a pair to decay over time, for example, by periodically multiplying the correlation coefficient by a decay factor that is slightly less than one (e.g., 0.95, or other values, depending on the desired rate of decay), when there is a lack of supporting evidence for correlation. Correlation coefficients that fall below a predetermined threshold may be deleted.

Figure 18:
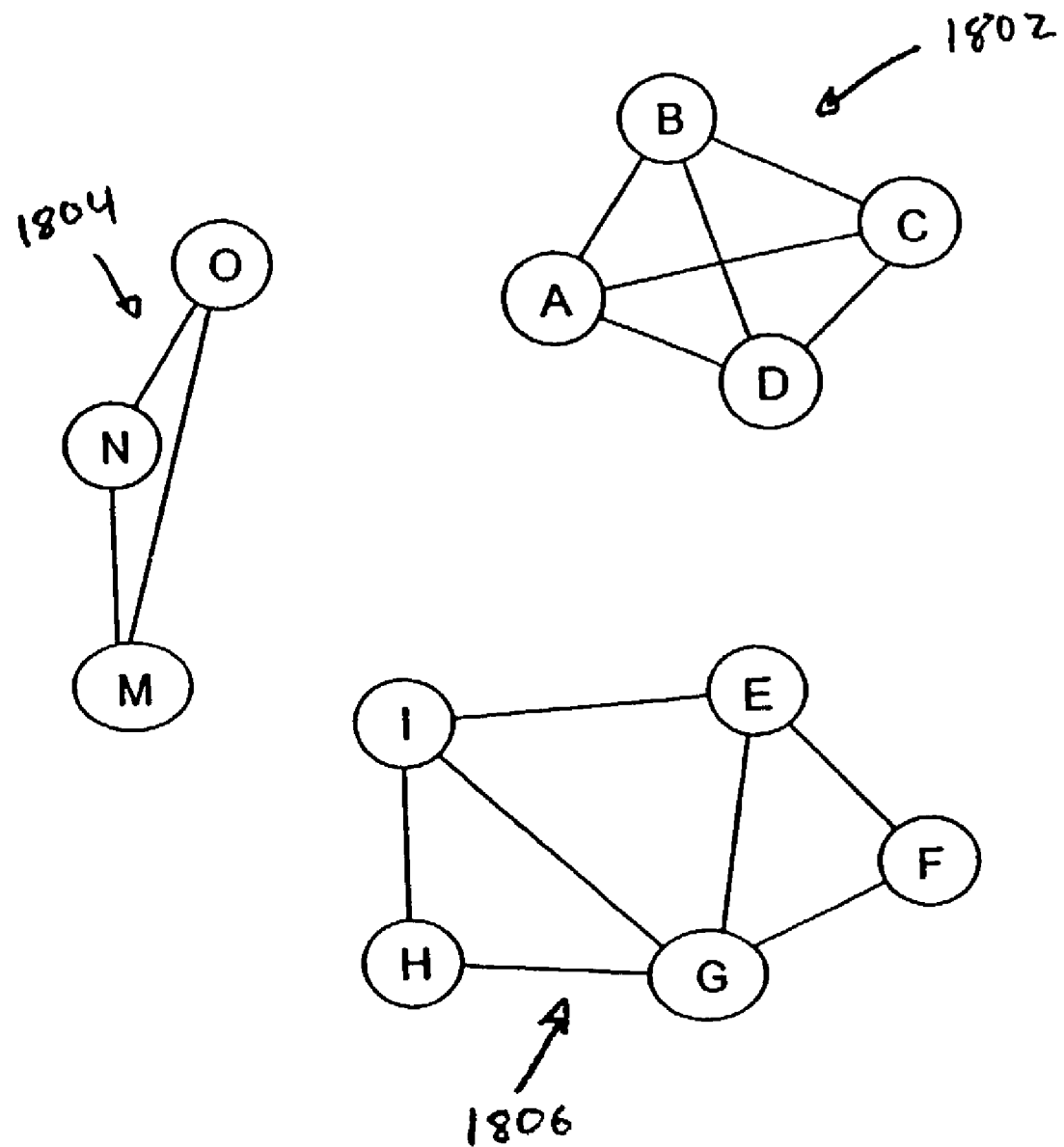
FIG. 18 is an example showing the result of using standard cluster analysis techniques in accordance with an embodiment of the invention.

As shown in FIG. 18, if a more standard cluster analysis approach were used, metric A would be placed into a cluster containing B-C-D or a cluster containing M-N-O or into neither cluster, rather than preserving all of metric A's correlations. FIG. 18 shows Metric A in B-C-D cluster 1802. Also, M-N-O cluster 1804 is separate from metrics of other clusters even though correlations exist between these metrics: A-M, C-M, E-M, and E-O. In addition to placing each metric into only one cluster, such cluster analysis techniques are typically static, meaning that the groupings cannot change. For these reasons, the correlation pair graphs in accordance with the present invention have advantages in this application over use of standard cluster analysis techniques.

Figure 19A:
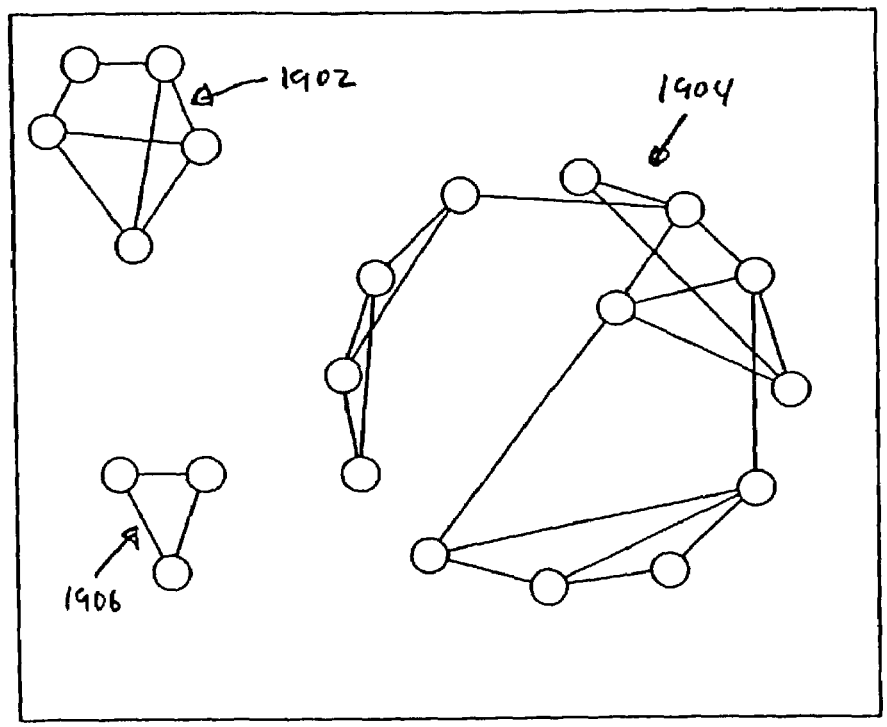
FIGS. 19A and 19B show an illustrative example of the dynamic nature of correlation pair graphs, in accordance with an embodiment of the invention.

As shown in FIG. 19A, it is possible to have disjointed groups in a correlation pair graph. The correlation pair graph in FIG. 19A has three such disjointed groups, groups 1902, 1904, and 1906. This is not the same as having multiple clusters in a cluster analysis graph, because the groups in a correlation pair graph are separate only because no correlation coefficient above a predetermined threshold exists between the nodes in the disjointed groups. The disjointed groups in a correlation pair graph are dynamic and adaptive.

Figure 19B:
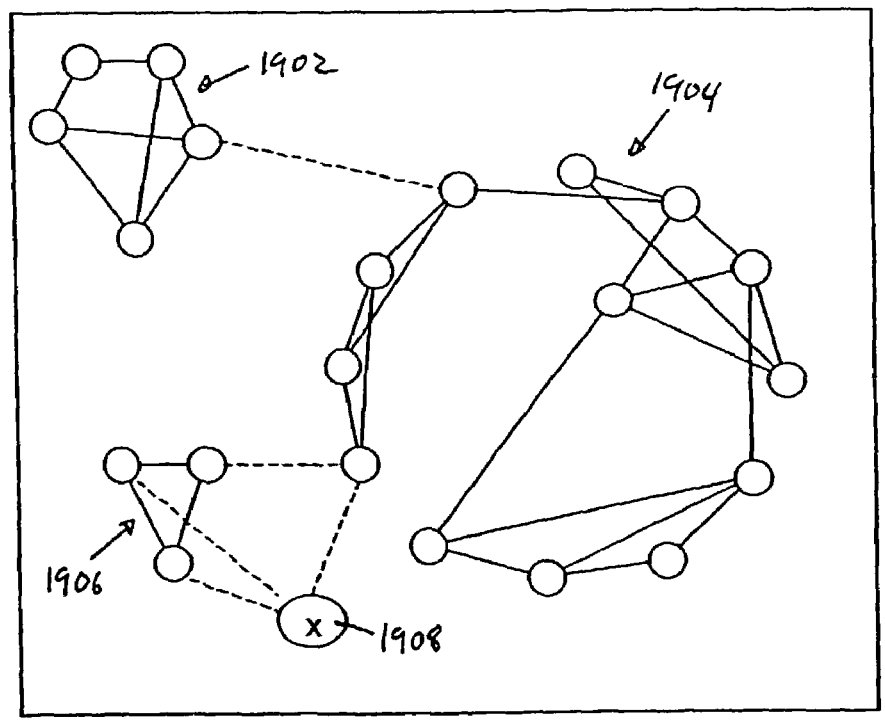

As the system continues to run, correlation links between metrics of disjointed groups can be added as seen in the example of FIG. 19B. One metric from group 1902 is correlated to one metric in group 1904. This single connection is weak and does not change much in the overall structure. Additionally, as shown in FIG. 19B, a new metric X (node 1908) is introduced to the structure. This causes four new correlated pairs to be added to the graph. Metric X (node 1908) is correlated to group 1904 (one connection) and strongly correlated to group 1906 (two connections). Group 1906 has one connection added to group 1904. These added connections alter the structure of the graph demonstrating that the correlation pair graph is adaptive, and not static.

Referring back to FIG. 14, once all the data is stored in the Correlation Pair Graph, the user interface (UI) may retrieve associated metrics on demand, through on-demand group generation module 1412.

If a significant event occurs, an operator may want to identify all metrics that may have an effect on a key metric so that the root cause of the event can be discerned. By using a UI the operator can identify these associated metrics by query to on-demand group generation module 1412, which, in turn accesses the correlation pair graph through correlation pair graph module 1410. This query can either be operator initiated or reports can be automatically generated. Additionally, other components of the system or analysis plug-ins, such as a root-cause analysis plug-in may submit queries through on-demand group generation module 1412.

To determine which metrics are associated with a key metric, on-demand group generation module 1412 applies two conditions to the metrics. A metric is considered "associated" with the key metric if either of the two conditions are met.

The first condition that a metric can meet to be considered "associated" with a key metric is that the metric must be correlated to the key metric, and to at least P % of the other metrics that are correlated to the key metric, where P is a predetermined threshold. Typically, P will be relatively low, for example 25 or 30 (though many other values in the range of 0 to 100 are possible), since the associated metric must also be directly correlated with the key metric.

For example, referring to the correlation pair graph shown in FIG. 17, if P=30 and the key metric is metric A (node 1704), then each of metrics B (node 1706), C (node 1708), D (node 1710), M (node 1722), and O (node 1726) are correlated with metric A (node 1704). Metric B (node 1706) is also correlated to 50% of the metrics (other than metric B) that are correlated with metric A (i.e., metrics C and D out of C, D, M, and O), and therefore satisfies the condition and is considered "associated" with metric A. Metric C (node 1708) is correlated to metrics B (node 1706), D (node 1710) and M (node 1722), representing 75% of the metrics (other than C) that are correlated to A. Thus metric C is also "associated" with metric A according to this first condition. Metric D (node 1710) is correlated to metrics B (node 1706) and C (node 1708), representing 50% of the metrics other than D that are correlated to the key metric A. Thus, metric D is considered associated with metric A, since it satisfies the first condition. Similarly, metric M (node 1722) is correlated with 50% of the other metrics that are correlated to metric A (i.e., metrics C and O), and is therefore associated with metric A. Finally, metric O (node 1726) is correlated to only one other metric that is correlated to metric A (i.e., metric M), which is only 25% of the other metrics that are correlated to metric A. Thus, since P=30, metric O does not satisfy the condition, and is not considered associated with metric A according to on-demand group generation module 1412.

The second condition that a metric can meet to be considered associated with the key metric is that the metric must be correlated with at least X % of the metrics that are correlated with the key metric, where X is a predetermined value. Typically X will be relatively high, such as 80 or 90 (though other values in the range of 0 to 100 are possible), since the metric meeting this second condition need not be correlated to the key metric.

Figure 20:
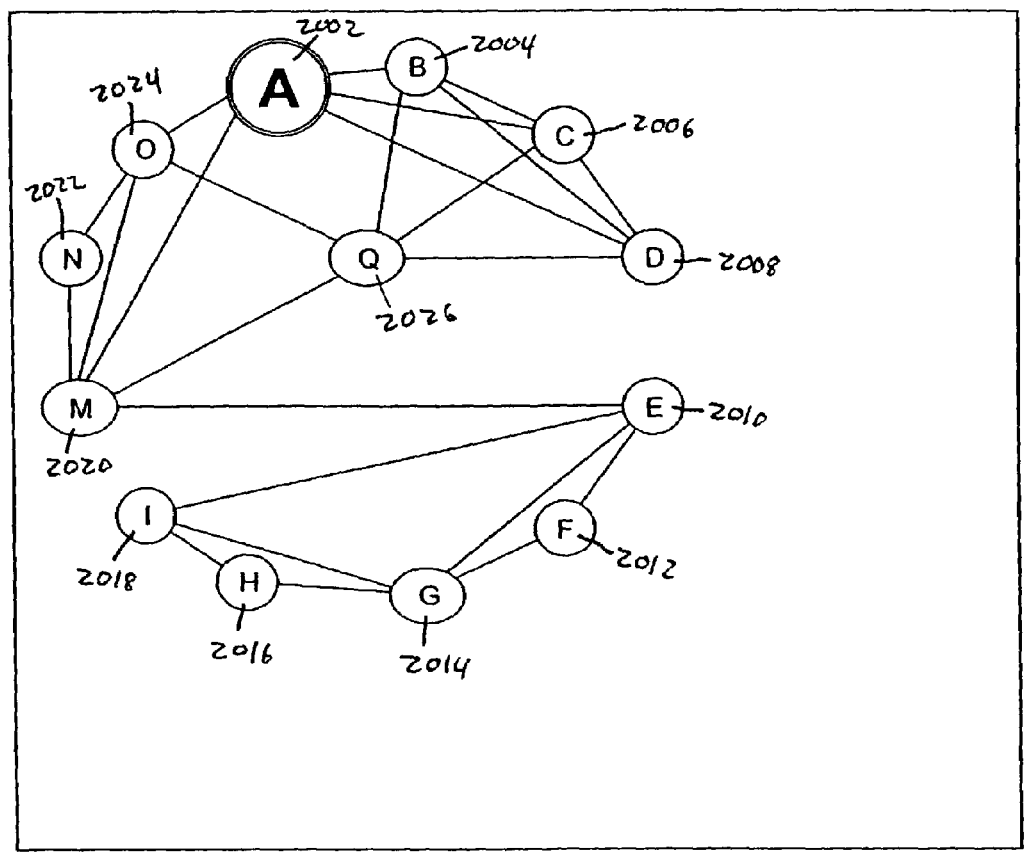
FIG. 20 shows an example correlation pair graph in which metrics associated with a key metric are identified, in accordance with an embodiment of the invention.

FIG. 20 shows an example correlation pair graph in which this second condition is met by metric Q (node 2026). Assuming that metric A (node 2002) is the key metric, and X=90, metric Q (2026) meets the second condition because it is correlated to metrics B (node 2004), C (node 2006), D (node 2008), M (node 2020), and O (node 2024), which represent 100% of the metrics associated with key metric A. Thus, even though metric Q (node 2026) is not itself correlated to metric A (node 2002), it is still considered associated with metric A, because it satisfies this second rule.

Because FIGS. 1–3, 5, 7, 11 and 14 are block diagrams, the enumerated items are shown as individual elements. In actual implementations of the invention, however, they may be inseparable components of other electronic devices such as a digital computer. Thus, actions described above may be implemented in software that may be embodied in an article of manufacture that includes a program storage medium.

What is claimed is:

1. A method for dynamically generating at least one metric threshold associated with a metric and indicating alarm conditions in a monitored system, the method comprising the steps of:
   repeatedly receiving data associated with the metric;
   statistically analyzing the received data,
   determining at least one value from the data using at least one heuristic technique including at least one of a quantile function and weighted linear regression techniques;
   equating the at least one value with an updated alarm threshold; and
   triggering an alarm on receipt of received data that violate the at least one updated alarm threshold.

2. The method of claim 1, wherein the metric relates to a computer network, and further comprising the step of using the alarm to assess performance in an e-commerce system.

3. The method of claim 1 further comprising the steps of (i) repeating the analysis step and (ii) adjusting the at least one updated alarm threshold based on previously established updated alarm limits.

4. The method of claim 3 further comprising the steps of:
   computing at least one value;
   filtering the at least one value; and
   equating the at last one updated alarm threshold to the at least one value.

5. The method of claim 1 wherein the step of statistically analyzing the received data further comprises the step of categorizing the received data as normal.

6. The method of claim 1 wherein the step of statistically analyzing the received data further comprises the step of categorizing the received data as normalizable.

7. The method of claim 1 wherein the step of statistically analyzing the received data further comprises the step of categorizing the received data as non-normal.

8. The method of claim 1 wherein the step of triggering an alarm further comprises the steps of:
   determining a fixed threshold by locking the updated alarm value to a value equal to the at least one value, and
   comparing the received data with the fixed threshold.

9. The method of claim 1 wherein the step of triggering an alarm further comprises the step of comparing the mean and standard deviation of the received data with the at least one updated alarm threshold.

10. The method of claim 1 wherein the step of triggering an alarm further comprises the steps of:
    normalizing the received data; and
    comparing the mean and standard deviation of the normalized received data with the at least one updated alarm threshold.

11. The method of claim 1 wherein the step of triggering an alarm further comprises the step of comparing the mean of the received data with the at least one updated alarm threshold.

12. The method of claim 1 for dynamically generating at least one metric threshold associated with a metric and indicating alarm conditions in a monitored system, further comprising the step of:
    filtering the at least one value by generating a time weighted sum of the received data as the at least one alarm threshold wherein each received data decays as a function of time.

13. A method for dynamically generating at least one metric threshold indicating alarm conditions in a monitored system, the method comprising the steps of:
    establishing at least one default alarm threshold associated with a metric, including
       repeatedly receiving data associated with the metric;
       statistically analyzing the received data to establish at least one updated alarm threshold; including
          categorizing the received data as one of normal and normalizable by applying at least one of a chi-square test and an Anderson-Darling test to the received data; and
          when the data is categorized as normalizable,
             operating on the received data with a function representing the estimated cumulative distribution of the received data, producing a first result; and
    operating on the first result with a quantile function of a normal distribution; and
    triggering an alarm on receipt of received data that violate the at least one updated alarm threshold.

14. A method for dynamically generating at least one metric threshold indicating alarm conditions in a monitored system, the method comprising the steps of:
    establishing at least one default alarm threshold associated with a metric, including
       repeatedly receiving data associated with the metric;
       statistically analyzing the received data to establish at least one updated alarm threshold; including
          computing at least one value;
          filtering the at least one value; and
          equating the at least one updated alarm threshold to the at least one value; wherein
          the at least one value is computed using at least one heuristic technique, including one of
             a quantile function technique, and
             a weighted linear regression technique; and
    updating the at least one alarm threshold by
       (i) repeating the analysis step and
       (ii) adjusting the at least one updated alarm threshold based on previously established updated alarm limits; and triggering an alarm on receipt of received data that violate the at least one updated alarm threshold.

15. A method for dynamically generating at least one metric threshold indicating alarm conditions in a monitored system, the method comprising the steps of:
  establishing at least one default alarm threshold associated with a metric, including
    repeatedly receiving data associated with the metric;
    statistically analyzing the received data to establish at least one updated alarm threshold;
    computing at least one value;
    filtering the at least one value; and
    equating the at last one updated alarm threshold to the at least one value; wherein
    the step of filtering further comprises computing a weighted sum of the received data;
  updating the at least one alarm threshold by
    (i) repeating the analysis step and
    (ii) adjusting the at least one updated alarm threshold based on previously established updated alarm limits; and
  triggering an alarm on receipt of received data that violate the at least one updated alarm threshold.

16. The method of claim 15 wherein the received data comprises historical data.

17. The method of claim 15 wherein the received data comprises a statistical summarization of raw metric data.

18. The method of claim 15 wherein the received data are associated with at least one predetermined time period.

19. Apparatus for dynamically generating at least one metric threshold associated with a metric and indicating alarm conditions in a monitored system, the apparatus comprising:
  a data manager for repeatedly receiving data associated with the metric;
  a threshold computation module for statistically analyzing the received data to establish a threshold when the data has one of a non-normal distribution and a non-normalizable distribution; and
    when the data has one of a non-normal distribution and a non-normalizable distribution,
      determining at least one value from the data using a heuristic technique including a quantile function and a linear regression technique, and
      equating the at least one value with an updated alarm threshold;
  a filter mechanism for filtering the at least one value by generating a time weighted sum of the received data as the at least one alarm threshold wherein each received data decays as a function of time;
  a limit store for storing at least one updated alarm threshold; and
  an alarm manager for triggering an alarm on receipt of received data that violates the at least one updated alarm threshold.

* * * * *